(12) United States Patent
Katoh et al.

(10) Patent No.: US 7,232,501 B2
(45) Date of Patent: Jun. 19, 2007

(54) LAMINATE SHEET, LAMINATE SHEET ROLL, AND PRODUCING METHODS THEREFOR

(75) Inventors: Kazuya Katoh, Saitama (JP); Jun Akiwa, Tokyo (JP); Takehito Nakayama, Kawaguchi (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 11/010,360

(22) Filed: Dec. 14, 2004

(65) Prior Publication Data

US 2005/0109454 A1 May 26, 2005

Related U.S. Application Data

(62) Division of application No. 10/612,087, filed on Jul. 3, 2003.

(30) Foreign Application Priority Data

| Jul. 5, 2002 | (JP) | ............................. 2002-197727 |
| May 9, 2003 | (JP) | ............................. 2003-131548 |

(51) Int. Cl.
| B32B 38/10 | (2006.01) |
| B29C 65/14 | (2006.01) |
| B29C 33/68 | (2006.01) |
| B32B 37/16 | (2006.01) |
| B32B 38/04 | (2006.01) |

(52) U.S. Cl. ...................... 156/270; 156/250; 156/264; 156/269; 156/289; 428/40.1; 428/41.7; 428/41.8

(58) Field of Classification Search ................ 156/250, 156/256, 267, 268, 269, 270; 428/40.1, 41.7, 428/41.8, 42.2, 42.3, 906; D16/474, 478
See application file for complete search history.

(56) References Cited

U.S. PATENT DOCUMENTS 3,349,765 A 10/1967 Blanford
4,153,496 A * 5/1979 Swift .......................... 156/384

(Continued)

FOREIGN PATENT DOCUMENTS

| DE | 599 159 | 6/1934 |
| DE | 974 588 | 2/1961 |
| JP | H6-18383 | 1/1994 |
| JP | H8-316175 | 11/1996 |
| WO | WO/00/031199 | 6/2000 |

OTHER PUBLICATIONS

European Patent Office Communication and European Search Report, EP 03 254 278.9, Sep. 7, 2004.

*Primary Examiner*—Melvin Mayes
*Assistant Examiner*—Sonya Mazumdar
(74) *Attorney, Agent, or Firm*—Posz Law Group, PLC

(57) ABSTRACT

An adhesive sheet 301A having a predetermined form is laminated onto a long release sheet 2A, and a protective member 5A which is thicker than the adhesive sheet 301A is provided in a position so as not to overlap the adhesive sheet 301A when a laminate sheet 1A is wound into a roll. According to this laminate sheet 1A, defects can be prevented from forming on the adhesive sheet 301A when the laminate sheet 1A is wound into a roll.

8 Claims, 14 Drawing Sheets

U.S. PATENT DOCUMENTS

| | | | |
|---|---|---|---|
| 4,711,686 A * | 12/1987 | Instance | 156/227 |
| 5,006,191 A * | 4/1991 | Schmidt | 156/268 |
| 5,907,345 A | 5/1999 | Bothner et al. | |
| 5,931,800 A * | 8/1999 | Rasmussen et al. | 602/57 |
| 6,403,191 B1 * | 6/2002 | Casagrande | 428/42.2 |
| 2004/0018329 A1 | 1/2004 | Katoh et al. | |

* cited by examiner

LAMINATE SHEET, LAMINATE SHEET ROLL, AND PRODUCING METHODS THEREFOR

CROSS REFERENCE TO RELATED APPLICATIONS

This application is a division of application Ser. No. 10/612,087, filed on Jul. 3, 2003, which is based upon and claims the benefit of Japanese Patent Applications No. 2002-197727 filed on Jul. 5, 2002, and No. 2003-131548 filed on May 9, 2003, the contents of which are incorporated herein by reference.

BACKGROUND OF THE INVENTION

1. Field of the Invention

The present invention relates to a laminate sheet constituted by an adhesive sheet having a predetermined form which is laminated onto a release sheet, and more particularly to a laminate sheet which is capable of reducing defects that may be formed on the adhesive sheet when the laminate sheet is wound into a roll.

2. Description of the Related Art

A conventional laminate sheet in which adhesive labels are laminated onto a release sheet is shown in FIG. 20 (Publication of Examined Utility Model Application No. H6-18383 (FIG. 1), Publication of Patent Application No. H8-316175 (FIGS. 3 through 6)). In recent years, such laminate sheets have come to be used in the manufacture of optical discs in order to laminate a cover sheet onto the light-receiving surface of the optical disc. As shown in FIG. 20, a conventional laminate sheet 1P is constituted by a long release sheet 2P and cover sheet portions 301P (adhesive sheets) provided continuously in the longitudinal direction of the release sheet 2P. The cover sheet portion 301P is constituted by an adhesive layer 31P and a light-transmitting base material 32P and has an identical form to an optical disc.

The laminate sheet 1P is wound into a roll form, transported and stored in a rolled state, and used by being pulled from the roll. When the laminate sheet 1P is wound into a roll in this manner, the cover sheet portions 301P are wound over other cover sheet portions 301P, and at this time, as shown in FIG. 21, traces (arc-form traces) of the contours of the cover sheet portions 301P are formed on the other cover sheet portions 301P due to winding pressure.

In order to prevent such arc-form traces from forming on the cover sheet portions 301P, the laminate sheet 1P may be wound at a reduced winding pressure, but the problem with a roll which has been wound at a reduced winding pressure is that the roll is likely to collapse.

Further, when the laminate sheet 1P is wound, foreign matter such as minute dust particles (normally with a diameter of 5 to 50 μm) may become trapped between the wound layers of the laminate sheet 1P. If the laminate sheet 1P is wound with foreign matter trapped in this manner, depressions caused by the foreign matter are formed in the cover sheet portions 301P.

Such arc-form traces and depressions formed in the cover sheet portions 301P as described above do not cause great problems in conventional optical discs, but in next-generation high capacity/high recording density optical discs (Blu-ray Discs), these arc-form traces and depressions become defects which may cause errors when data are read.

SUMMARY OF THE INVENTION

The present invention has been designed in consideration of such circumstances, and it is an object thereof to provide a laminate sheet which is capable of preventing the formation of defects on an adhesive sheet when the laminate sheet is wound into a roll and a producing method therefor, and a laminate sheet roll which is capable of preventing the formation of defects on an adhesive sheet and a producing method therefor.

In order to achieve this object, a first aspect of the present invention is the provision of a laminate sheet formed by laminating an adhesive sheet having a predetermined form and a protective member in different positions on a long release sheet, wherein the protective member is thicker than the adhesive sheet and is provided so as not to overlap the adhesive sheet when the laminate sheet is wound into a roll. The protective member is preferably laminated onto the same side of the release sheet as the adhesive sheet, but all of or one part of the protective member may be laminated onto the opposite side to the adhesive sheet.

In the invention described above, the protective member which is thicker than the thickness of the adhesive sheet is provided on the laminate sheet, and thus when the laminate sheet is wound into a roll, a gap is produced between the surface of the adhesive sheet and the back surface of the release sheet which is wound thereon. Moreover, the protective member is provided so as not to overlap the adhesive sheet when the laminate sheet is wound into a roll. Thus when the laminate sheet is wound into a roll, the contour parts of other adhesive sheets and the protective member do not press forcefully upon the adhesive sheet, and as a result, traces caused by winding pressure can be reliably prevented from forming on the adhesive sheet.

Further, even when foreign matter such as minute dust particles becomes trapped between the layers of the wound laminate sheet during the winding of the laminate sheet, the gap exists between the surface of the adhesive sheet and the back surface of the release sheet, and thus the formation of depressions on the adhesive sheet caused by the foreign matter can be suppressed.

According to the invention as described above, defects which may be formed on the adhesive sheet when the laminate sheet is wound into a roll can be dramatically reduced.

In the invention described above, the adhesive sheet is preferably provided continuously in a central portion in the direction of width of the release sheet, and the protective member is preferably provided on both side portions in the direction of width of the release sheet. By constituting the laminate sheet in this manner, defects which maybe formed on the adhesive sheet when the laminate sheet is wound into a roll can be effectively reduced.

A second aspect of the present invention is the provision of a laminate sheet formed by laminating an adhesive sheet having a predetermined form and a protective member in different positions on a long release sheet, wherein the protective member is thicker than the adhesive sheet and is provided so as to partially overlap the adhesive sheet when the laminate sheet is wound into a roll. Here, overlap of the protective member and adhesive sheet indicates that the protective member and adhesive sheet overlap in the radial direction of the roll, and includes both indirect overlap (with the release sheet interposed therebetween) and direct overlap (when the release sheet is not interposed therebewteen). Note that the protective member is preferably laminated onto the same side of the release sheet as the adhesive sheet, but all of or one part of the protective member may be laminated onto the opposite side to the adhesive sheet.

In the invention described above, the protective member which is thicker than the thickness of the adhesive sheet is provided on the laminate sheet, and thus when the laminate sheet is wound into a roll, a gap is produced between the surface of the adhesive sheet and the back surface of the release sheet which is wound thereon. Thus the contour parts of other adhesive sheets do not press forcefully upon the adhesive sheet, and as a result traces caused by winding pressure are prevented from forming on the adhesive sheet.

Further, even when foreign matter such as minute dust particles becomes trapped between the layers of the wound laminate sheet during the winding of the laminate sheet, the gap exists between the surface of the adhesive sheet and the back surface of the release sheet, and thus the formation of depressions on the adhesive sheet caused by the foreign matter can be suppressed. Hence according to the invention, defects which may be formed on the adhesive sheet when the laminate sheet is wound into a roll can be dramatically reduced.

Further, by having the protective member partially overlap the adhesive sheet when the laminate sheet is wound into a roll, the surface contact area between the surfaces of the protective member and release sheet is ensured to a certain degree and the part of the roll at which protective members overlap bears the greatest winding pressure. Hence stability as a roll is high and the roll is unlikely to collapse during use, transportation, and so on.

In the invention described above, the adhesive sheet is preferably provided in a continuous plurality in a central portion in the direction of width of the release sheet such that gaps are formed at least in the vicinity of the both side portions in the direction of width of the release sheet, and the protective member is preferably provided on both side portions in the direction of width of the release sheet and in the gaps between the plurality of adhesive sheets. By constituting the laminate sheet in this manner, defects which maybe formed in the adhesive sheet can be effectively reduced, and stability as a roll can be effectively improved.

In the inventions described above, the thickness of the protective member is preferably greater than the thickness of the adhesive sheet by 5 to 100 μm. By setting the thickness of the protective member thus, an effect of preventing traces caused by winding pressure and depressions caused by foreign matter from forming on the adhesive sheet can be sufficiently obtained, and excessive increases in the diameter (volume) of the roll can be avoided.

In the invention described above, the surface area of the overlapping part between the protective member and adhesive sheet is preferably not more than 50% of the surface area of the adhesive sheet. According to this invention, the surface area of the laminate sheet occupied by the protective member is suppressed, and thus a number of formed adhesive sheets can be ensured. Note that "the overlapping part between the protective member and adhesive sheet" in this specification corresponds to a part of the protective member which exists further inside in the direction of width than a virtual straight line which connects the outermost edge of adjacent adhesive sheets in the direction of width of the release sheet.

In the inventions described above, the adhesive sheet may comprise a base material constituted by a resin sheet, and an adhesive layer. When the adhesive sheet is constituted in such a manner, traces caused by winding pressure and depressions caused by foreign matter are likely to form on the adhesive sheet, but by means of the present invention, these defects can be effectively reduced.

In the inventions described above, the adhesive sheet may be an optical discs producing adhesive sheet. A cover sheet for protecting the recording layer, a sheet having an adhesive layer (stamper receiving layer) on which guiding grooves, pits, or the like are formed, and so on can be cited as examples of the optical disc producing adhesive sheet. When the adhesive sheet is used in the production of optical discs, and particularly next-generation optical discs, the formation of traces caused by winding pressure and depressions caused by foreign matter on the adhesive layer, base material, and so on is highly problematic, but by means of the present invention, these defects can be effectively reduced.

A third aspect of the present invention is the provision of a laminate sheet roll formed by winding the laminate sheet described above.

A fourth aspect of the present invention is the provision of a producing method for a laminate sheet comprising the steps of: laminating an adhesive sheet and a protective sheet successively onto a long release sheet; cutting the protective sheet such that when the obtained laminate sheet is wound into a roll, the protective sheet and the adhesive sheet in a target form do not overlap; removing the unnecessary portions of the protective sheet to form a protective member comprising the remaining protective sheet and the adhesive sheet positioned therebelow; cutting the adhesive sheet into the target form thereof; and removing the unnecessary portions of the adhesive sheet to form the adhesive sheet in the target form thereof.

A fifth aspect of the present invention is the provision of a producing method for a laminate sheet comprising the steps of: laminating an adhesive sheet and a protective sheet successively onto a long release sheet; cutting the protective sheet such that when the obtained laminate sheet is wound into a roll, the protective sheet and the adhesive sheet in a target form partially overlap; removing the unnecessary portions of the protective sheet to form a protective member comprising the remaining protective sheet and the adhesive sheet positioned therebelow; cutting the adhesive sheet into the target form thereof; and removing the unnecessary portions of the adhesive sheet to form the adhesive sheet in the target form thereof.

In the inventions described above, the adhesive layer and base material are preferably laminated successively when the adhesive sheet is laminated.

Further, in the inventions described above, when the protective sheet is cut, the protective sheet and adhesive sheet are preferably cut integrally such that the cuts do not reach the release sheet.

A sixth aspect of the present invention is the provision of a producing method for a laminate sheet comprising the steps of: laminating an adhesive sheet onto a long release sheet; providing protective portions on the adhesive sheet at an arbitrary stage to form a protective member comprising the protective portions and the adhesive sheet positioned therebelow; cutting the adhesive sheet into a target form such that when the obtained laminate sheet is wound into a roll, the protective portions and the adhesive sheet in target form do not overlap; and removing the unnecessary portions of the adhesive sheet to form the adhesive sheet in the target form thereof. A method of sticking adhesive tape to the adhesive sheet, an ink printing method, a coating application method, or similar may be cited as examples of methods for providing the protective portion on the adhesive sheet.

According to the inventions described above, the aforementioned laminate sheet roll can be produced efficiently, and according to the invention described above, the laminate sheet roll can be produced even more efficiently.

A seventh aspect of the present invention is the provision of a producing method for a laminate sheet roll, comprising the steps of producing a laminate sheet using any of the laminate sheet producing methods described above and then winding the obtained laminate sheet into a roll.

DESCRIPTION OF THE PREFERRED EMBODIMENTS

Embodiments of the present invention will be described below with reference to the drawings. In the following embodiments, description is provided using as an example a laminate sheet which is used for laminating a cover sheet onto the recording layer of an optical disc during the production of the optical disc. However, the present invention is not limited thereto, and may be applied to various laminate sheets.

First Embodiment

Figure 1:
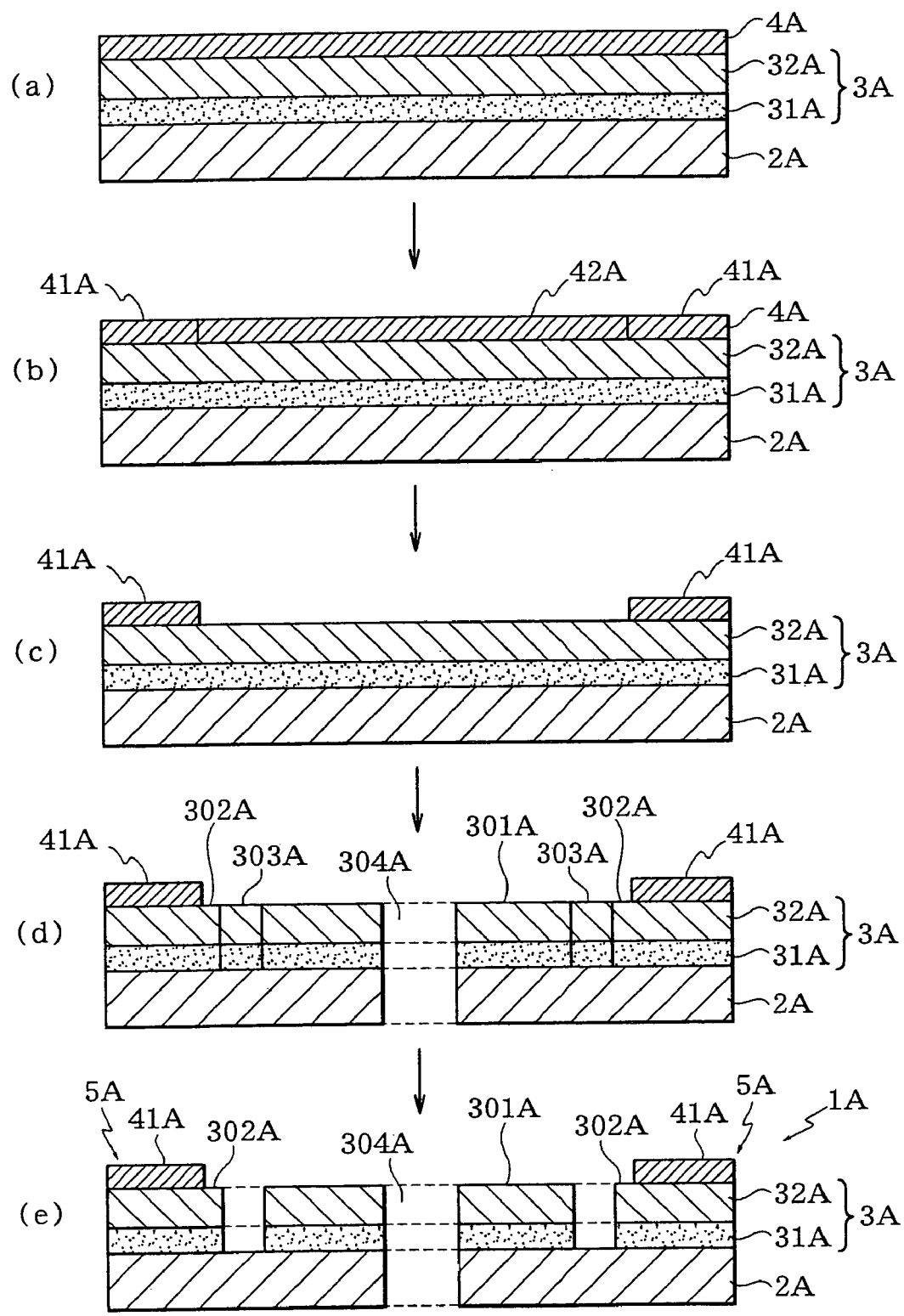
FIG. 1 is a sectional view showing a producing method for a laminate sheet according to a first embodiment of the present invention.
Figure 2:
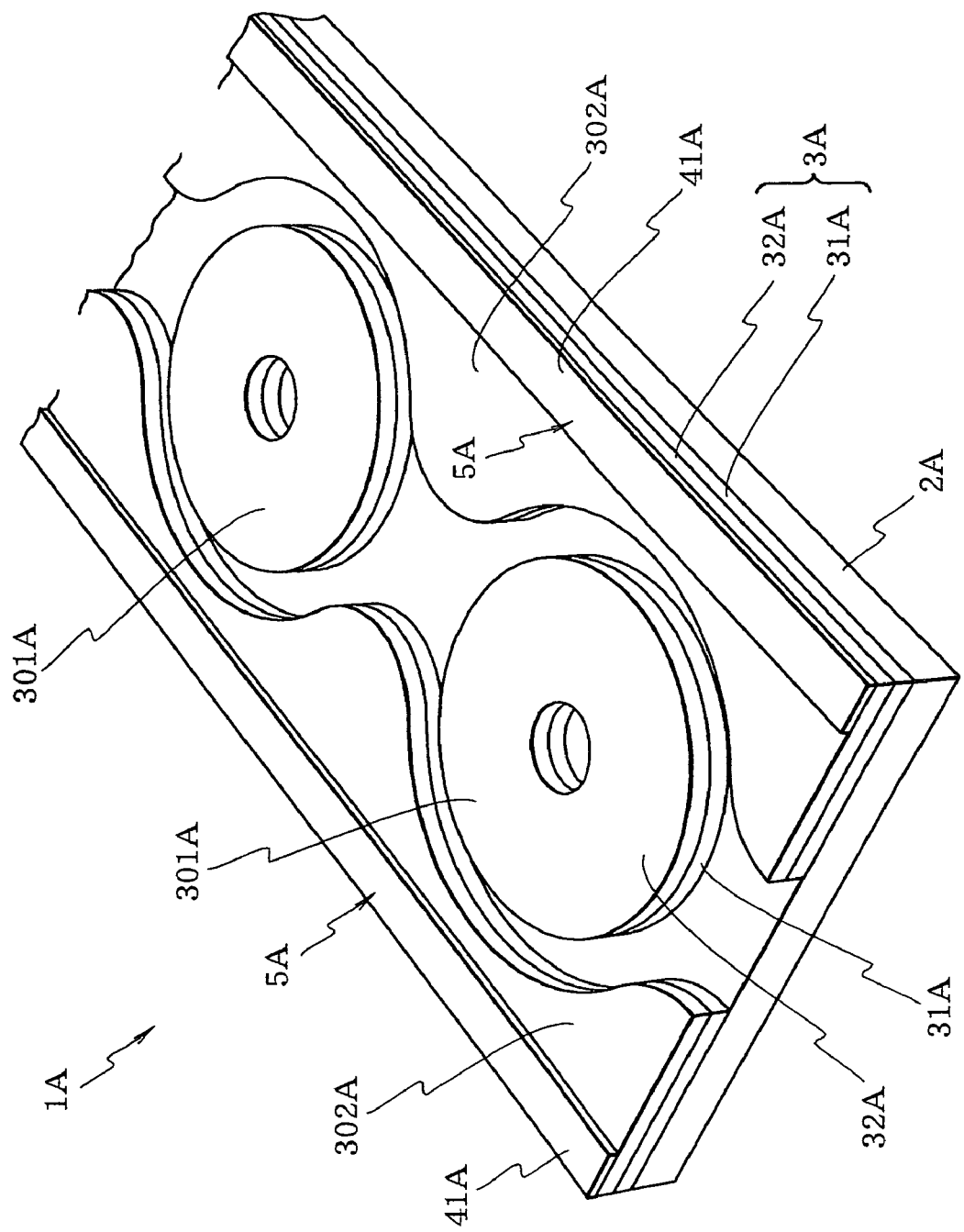
FIG. 2 is a perspective view of the laminate sheet according to the first embodiment of the present invention.
Figure 3:
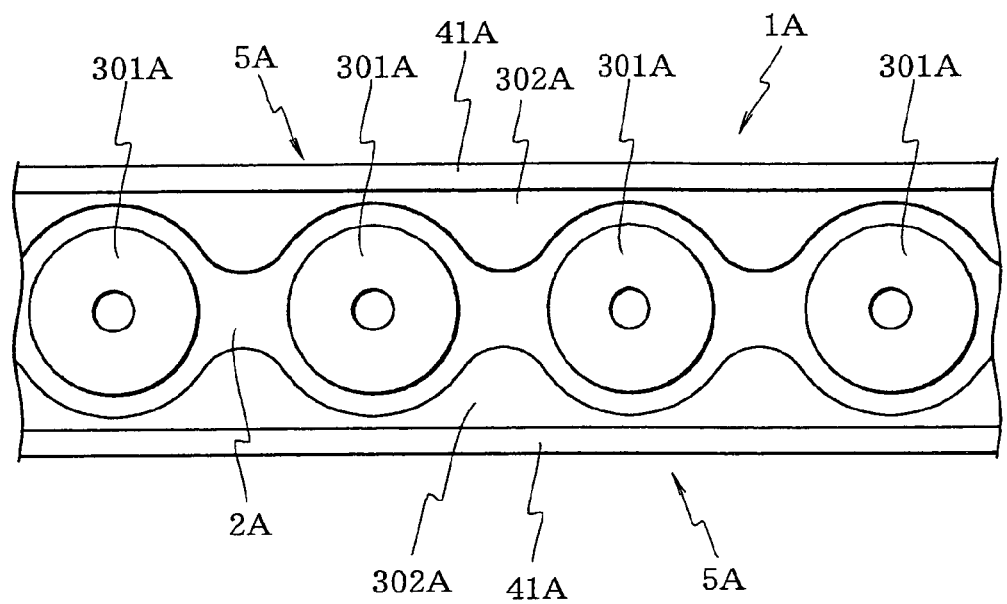
FIG. 3 is a plan view of the laminate sheet according to the first embodiment.
Figure 4:
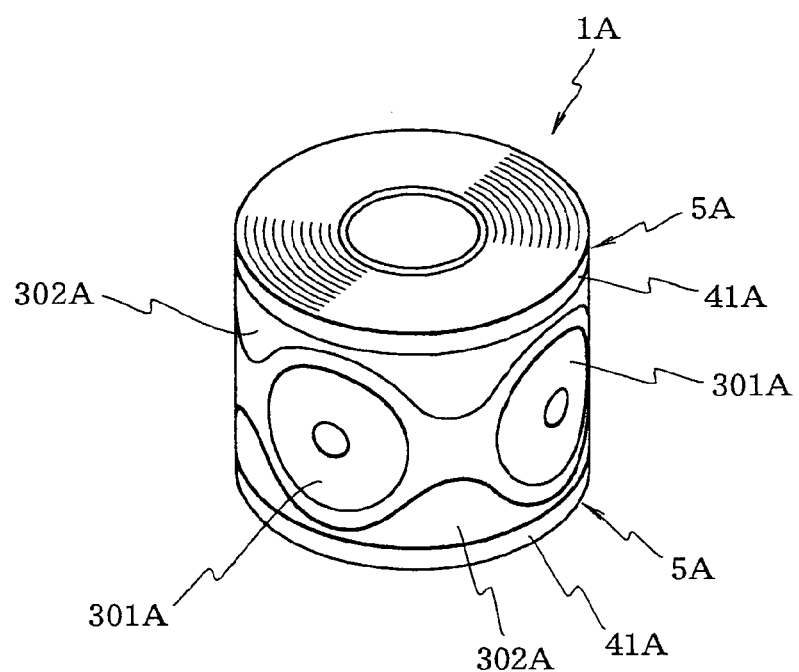
FIG. 4 is a perspective view of a laminate sheet roll according to the first embodiment.

FIGS. 1(a) through 1(e) are sectional views showing a producing method for a laminate sheet according to a first embodiment of the present invention, FIG. 2 is a perspective view of the laminate sheet according to the first embodiment of the present invention, FIG. 3 is a plan view of the laminate sheet according to the first embodiment, and FIG. 4 is a perspective view of a laminate sheet roll according to the first embodiment.

In order to produce a laminate sheet 1A according to this embodiment, first, as shown in FIG. 1(a), an adhesive layer 31A, a base material 32A, and a protective sheet 4A are successively laminated onto a release surface of a long release sheet 2A. Note that the adhesive layer 31A and base material 32A together constitute an adhesive sheet 3A.

A well-known sheet may be used as the release sheet 2A, for example a resin film such as a polyethylene terephthalate film or polypropylene film, or paper such as glassine paper, clay-coated paper, or laminated paper (mainly polyethylene laminated paper) which has been subjected to release treating using a silicone type release agent or the like. The thickness of the release sheet 2A is normally approximately 10 to 200 μm, and preferably approximately 20 to 100 μm.

A pressure sensitive adhesive is normally used as the adhesive which constitutes the adhesive layer 31A, but the present invention is not limited thereto, and an energy rays-curable adhesive, for example, may be used. Any one of an acrylic type, polyester type, urethane type, rubber type, silicone type, or other pressure sensitive adhesive maybe used, and this may be curable pressure sensitive adhesive.

To form the adhesive layer 31A, for example, a coating agent containing the adhesive which constitutes the adhesive layer 31A and, if desired, a solvent is prepared. The coating agent is then applied to the release surface of the release sheet 2A using a coating machine such as a kiss roll coater, a reverse roll coater, a knife coater, a roll knife coater, or a die coater, and dried. The base material 32A is then fixed by pressure onto the adhesive layer 31A formed in such a manner, thereby forming the adhesive sheet 3A constituted by the adhesive layer 31A and base material 32A. The thickness of the adhesive layer 31A is normally approximately 5 to 100 μm and preferably approximately 10 to 30 μm.

A cover sheet for the recording layer of an optical disc, which constitutes the light-receiving surface of the optical disc, may be cited as an example of the base material 32A in this embodiment. Any material having a sufficient light-transmitting property for transmitting light in wavelength bands required for reading information may be used as the material of the base material 32A, but in order to facilitate production of the optical disc, a material with suitable rigidity and flexibility is preferable, and in order to store the optical disc, a material which is stable in respect of temperature is preferable. For example, a resin such as polycarbonate, polymethyl methacrylate, or polystyrene may be used as such a material.

The coefficient of linear expansion of the base material 32A is preferably substantially identical to the coefficient of linear expansion of the optical disc substrate in order to prevent warping of the optical disc at high temperatures. If the optical disc substrate is constituted by a polycarbonate resin, for example, the base material 32A is preferably formed from an identical polycarbonate resin.

The thickness of the base material 32A is determined in accordance with the type of the optical disc or the thickness of the other constitutional regions of the optical disc. This thickness is normally approximately 25 to 200 μm and preferably approximately 50 to 100 μm.

An identical material to that of the aforementioned release sheet 2A may also be used as the base material 32A in this embodiment. In this case, the release surface of the base material 32A is stuck to the adhesive layer 31A which is laminated on the release sheet 2A. According to such a laminate sheet, the release sheet 2A is peeled away from the adhesive layer 31A and the exposed adhesive layer 31A is stuck to the recording layer of the optical disc, then the base material 32A is peeled away from the adhesive layer 31A such that another base material (a cover sheet base material for protecting the recording layer of the optical disc) can be stuck to the adhesive layer 31A. If the adhesive layer 31A is constituted by a curable pressure sensitive adhesive, concavo-convex patterns such as guiding grooves or pits can be provided on the exposed adhesive layer 31A using a stamper.

There are no particular limitations on the material constituting the protective sheet 4A, but a material comprising an adhesive layer laminated onto a base material constituted by resin film, paper, metal foil, or the like is preferably used.

For example, a resin film constituted by a resin such as polyethylene, polypropylene, polybutene, polybutadiene, vinyl chloride, ionomer, ethylene-methacrylic acid copolymer, polyethylene terephthalate, polyethylene naphthalate, polybutylene terephthalate, polyimide, polyetherimide, polyaramid, polyether ketone, polyether ether ketone, polyphenylene sulphide, poly-(4-methypentene-1), or polytetrafluoroethylene, a crosslinked resin of the above resin, or a laminated body of such resin films is preferably used as the base material for the protective sheet 4A.

The adhesive which constitutes the adhesive layer of the protective sheet 4A is preferably a pressure sensitive adhesive. In this case, the protective sheet 4A may be attached by pressure onto the base material 32A of the adhesive sheet 3A. Any one of an acrylic type, polyester type, urethane type, rubber type, silicone type, ethylene-vinyl acetate type, or other pressure sensitive adhesive maybe used, and this maybe curable pressure sensitive adhesive.

The thickness of the protective sheet 4A is preferably between 5 and 100 μm, and more preferably between 25 and 75 μm. If the thickness of the protective sheet 4A is less than 5 μm, the effects of the present invention cannot be obtained sufficiently, and if the thickness of the protective sheet 4A exceeds 100 μm, the diameter (volume) of the roll obtained when the laminate sheet 1A is wound becomes too large.

After the release sheet 2A, adhesive sheet 3A, and protective sheet 4A have been laminated together as shown in FIG. 1(a), cuts which do not reach the adhesive sheet 3A are made in the protective sheet 4A only as shown in FIG. 1(b), whereby the protective sheet 4A is divided into protective portions 41A on the both side portions in the direction of width and a residual portion 42A in a central portion in the direction of width. The cuts made in the protective sheet 4A may be made according to a typical method, for example using a punching machine or the like. Note that the protective portions 41A are set to be slightly narrower than the minimum width of a bolster portion 302A to be formed at a later stage.

The residual portion 42A of the protective sheet 4A which is formed as a result of the cutting described above is removed as shown in FIG. 1(c) to form the protective portions 41A.

Next, as shown in FIG. 1(d), cuts which do not reach the release sheet 2A are made in the adhesive sheet 3A, whereby the adhesive sheet 3A is divided into cover sheet portions 301A, bolster portions 302A, and a residual portion 303A. The central portion of the cover sheet portion 301A is punched out to form a central hole portion 304A. Cutting and punching of the adhesive sheet 3A may be performed by means of a typical method, for example using a punching machine or the like.

As shown in FIGS. 2 and 3, the planar form of the cover sheet portion 301A is an identical disc form to the form of an optical disc. The planar form of the bolster portion 302A, as shown in FIGS. 2 and 3, is an overall wave form running along the outer periphery of the cover sheet portions 301A which recedes toward the protective portion 41A sides and protrudes between the cover sheet portions 301A so as to intrude between the cover sheet portions 301A.

Finally, as shown in FIG. 1(e), the residual portion 303A of the adhesive sheet 3A is removed. As shown in FIGS. 2 and 3, the laminate sheet 1A produced in this manner is constituted by the long release sheet 2A, a plurality of the disc-form cover sheet portions 301A constituted by the adhesive layer 31A and the base material 32A and provided continuously in the central portion in the direction of width on the release surface of the release sheet 2A, the wave-form bolster portion 302A constituted by the adhesive layer 31A and the base material 32A and provided on the both side portions in the direction of width on the release surface of the release sheet 2A, and the strip-form protective portions 41A provided on the outside edge portions of the bolster portion 302A.

In this laminate sheet 1A, the protective portions 41A and the adhesive sheet 3A (bolster portion 302A) positioned below the protective portions 41A are combined to form a protective member 5A. The protective member 5A is thicker than the cover sheet portion 301A by the thickness of the protective portion 41A.

When the laminate sheet 1A described above is wound into a roll form as shown in FIG. 4, the protective member 5A which is thicker than the thickness of the cover sheet portion 301A is provided on the laminate sheet 1A, and therefore a slight gap is produced between the surface of the cover sheet portion 301A and the back surface of the release sheet 2A which is wound thereon. Moreover, the protective member 5A (protective portions 41A) is positioned so as not to overlap the cover sheet portion 301A. Thus the contour parts of other cover sheet portions 301A, the bolster portion 302A, and the protective portions 41A do not press forcefully upon the cover sheet portion 301A, and as a result, traces caused by winding pressure are reliably prevented from forming on the cover sheet portion 301A.

Further, when foreign matter such as minute dust particles becomes trapped between the layers of the wound laminate sheet 1A during the winding of the laminate sheet 1A, the gap exists between the surface of the cover sheet portion 301A and the back surface of the release sheet 2A, and thus, as long as the diameter of the foreign matter is smaller than the size of the gap, depressions formed in the cover sheet portion 301A by the foreign matter can be prevented. Moreover, in a conventional roll, even if only one foreign matter particle becomes trapped, the effect thereof causes depressions to form in a plurality of overlapped cover sheets. In the roll of the laminate sheet 1A according to this embodiment, however, the release sheet 2A and cover sheet portion 301A can be displaced in the radial direction of the roll by the size of the gap, and thus even if a foreign matter particle with a larger diameter than the size of the gap becomes attached on the cover sheet portion 301A, the effect thereof on other cover sheet portions 301A can be suppressed such that depressions caused by the foreign matter particle can be prevented from forming on a plurality of the cover sheet portions 301A.

Note that the bolster portion 302A is provided on the laminate sheet 1A according to this embodiment. An advantage of providing the bolster portion 302A at an identical thickness to the thickness of the cover sheet portion 301A in this manner is that the rigidity of the entire laminate sheet 1A is ensured such that when the laminate sheet 1A is wound into a roll, deformation of the roll can be suppressed.

According to the laminate sheet 1A of this embodiment as described above, defects which may be formed in the cover sheet portions 301A when the laminate sheet 1A is wound into a roll can be dramatically reduced.

Second Embodiment

Figure 5:
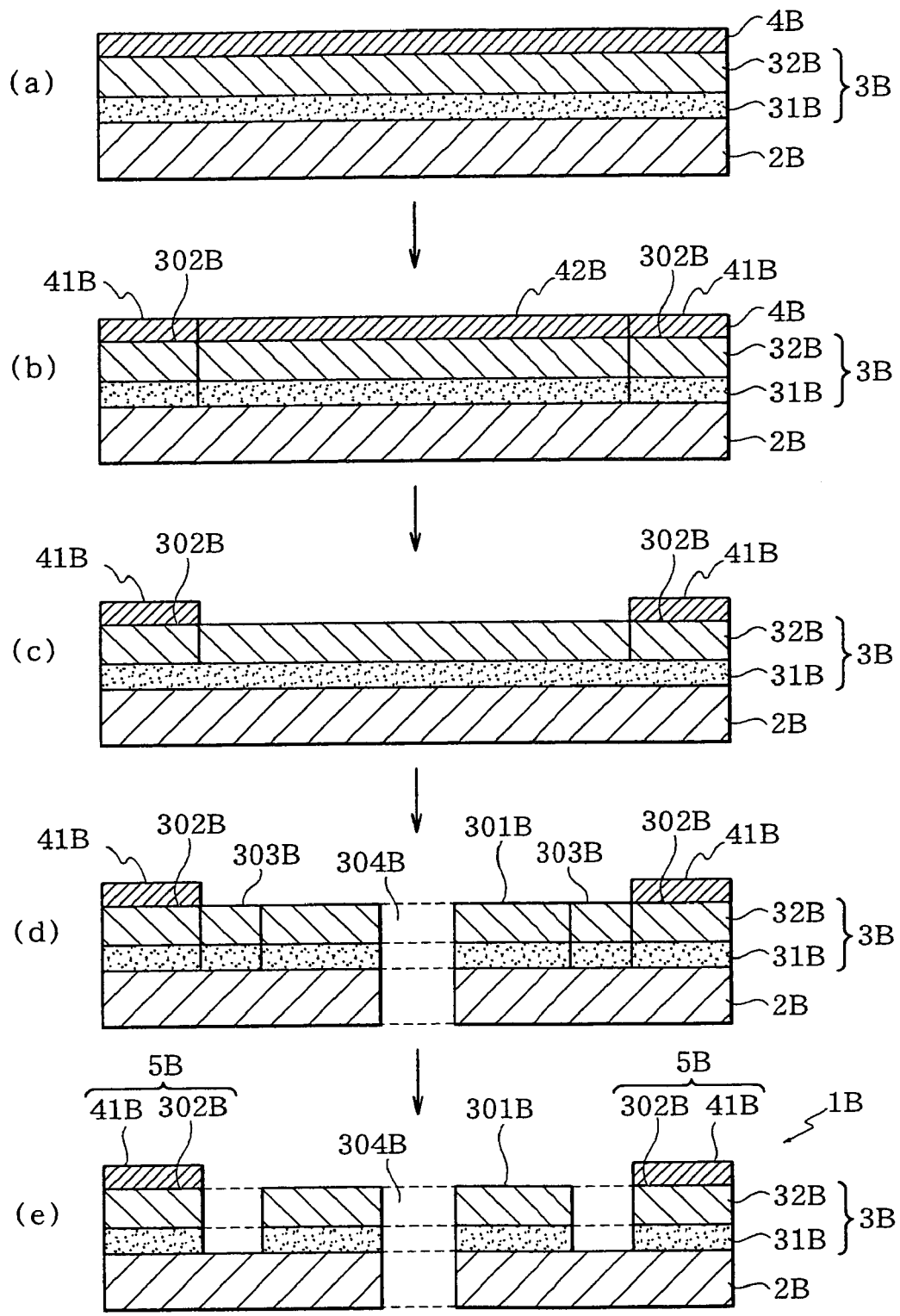
FIG. 5 is a sectional view showing a producing method for a laminate sheet according to a second embodiment of the present invention.
Figure 6:
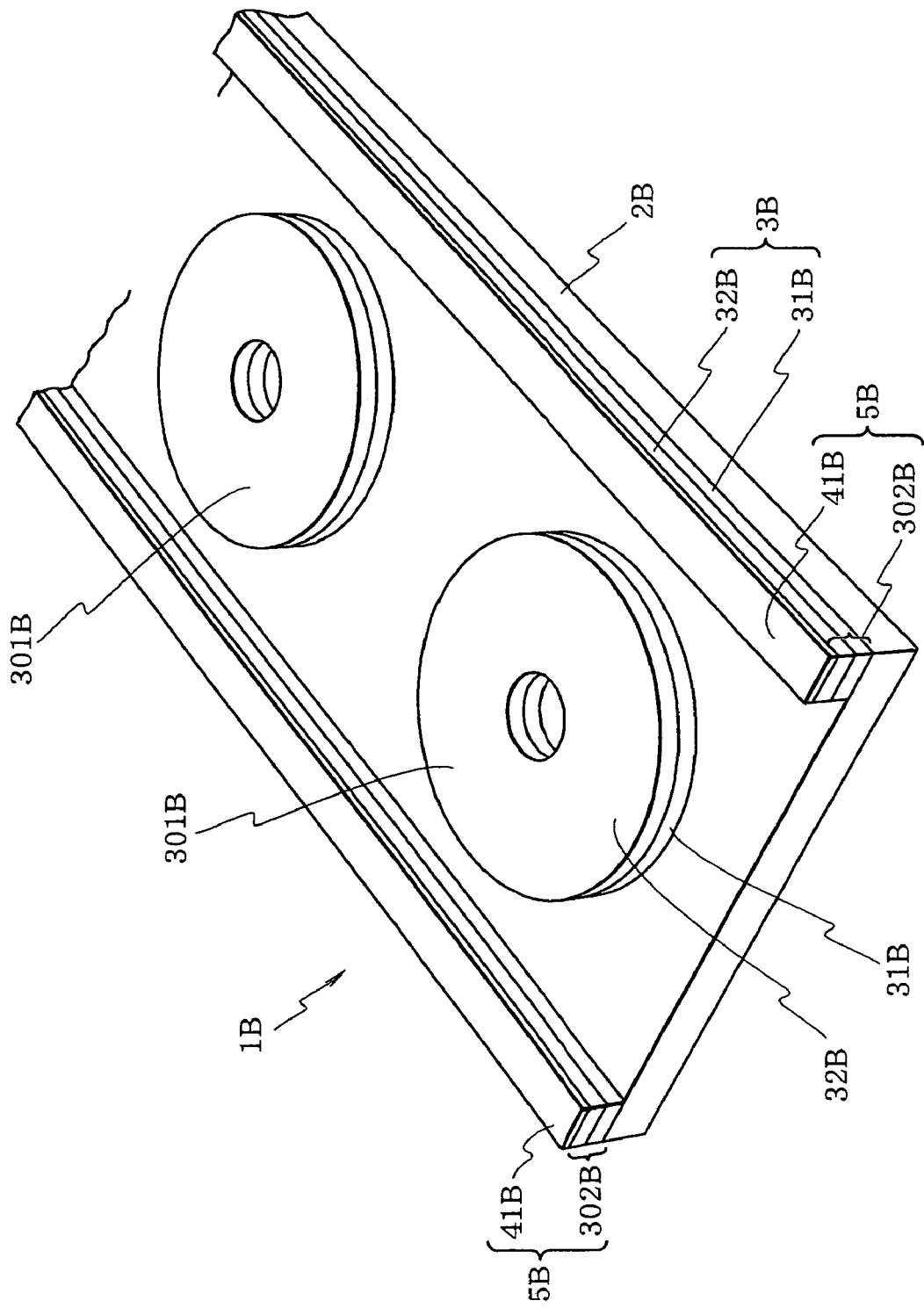
FIG. 6 is a perspective view of the laminate sheet according to the second embodiment of the present invention.
Figure 7:
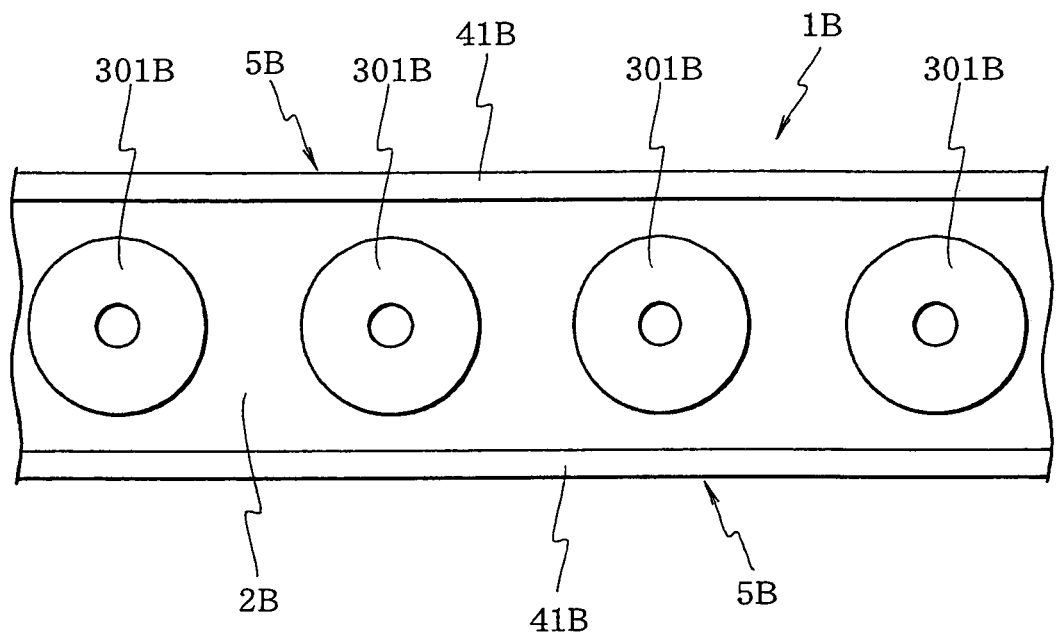
FIG. 7 is a plan view of the laminate sheet according to the second embodiment.
Figure 8:
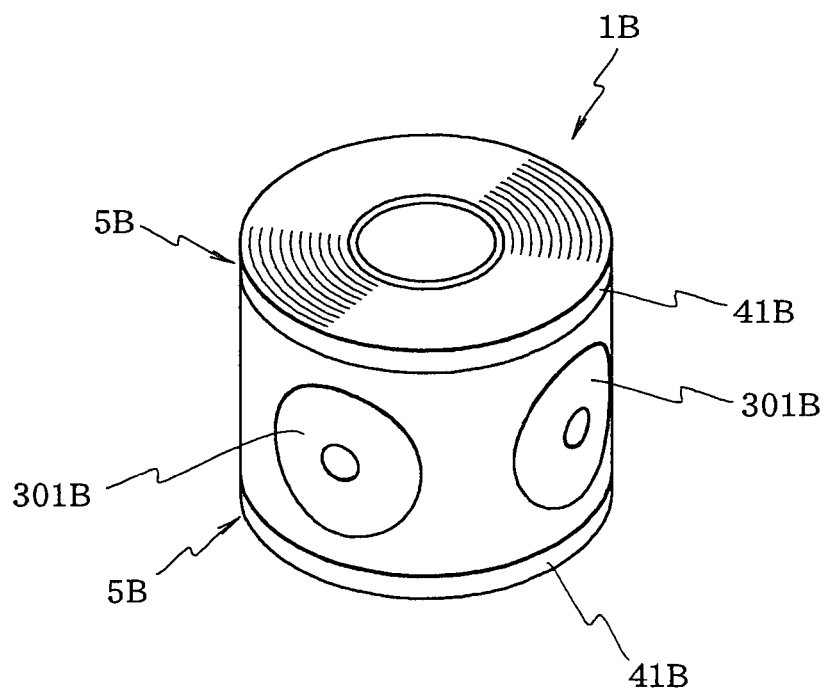
FIG. 8 is a perspective view of a laminate sheet roll according to the second embodiment.

FIGS. 5(a) through 5(e) are sectional views showing a producing method for a laminate sheet according to a second embodiment of the present invention, FIG. 6 is a perspective view of the laminate sheet according to the second embodiment of the present invention, FIG. 7 is a plan view of the laminate sheet according to the second embodiment, and FIG. 8 is a perspective view of a laminate sheet roll according to the second embodiment.

In order to produce a laminate sheet 1B according to this embodiment, first, as shown in FIG. 5(a), an adhesive layer 31B, a base material 32B, and a protective sheet 4B are successively laminated onto a release surface of a long release sheet 2B. Note that the adhesive layer 31B and base material 32B together constitute an adhesive sheet 3B.

Similar materials to those used for the release sheet 2A, adhesive layer 31A, base material 32A, and protective sheet 4A of the laminate sheet 1A according to the first embodiment described above may be used as the materials for the release sheet 2B, adhesive layer 31B, base material 32B, and protective sheet 4B.

Once the release sheet 2B, adhesive sheet 3B, and protective sheet 4B have been laminated as shown in FIG. 5(a), cuts which do not reach the release sheet 2B are made in the protective sheet 4B and adhesive sheet 3B as shown in FIG. 5(b), whereby the protective sheet 4B is divided into protective portions 41B on the both side portions in the direction of width and a residual portion 42B in the center in the direction of width, and the adhesive sheet 3B is divided into protective portions 302B on the both side portions in the direction of width and a central portion in the direction of width.

The residual portion 42B of the protective sheet 4B which is formed as a result of the cutting described above is removed as shown in FIG. 5(c) to form the protective portions 41B.

Next, as shown in FIG. 5(d), cuts which do not reach the release sheet 2B are made in the adhesive sheet 3B, whereby the central portion in the direction of width of the adhesive sheet 3B is divided into cover sheet portions 301B and a residual portion 303B. The central portion of the cover sheet portion 301B is punched out to form a central hole portion 304B. The planar form of the cover sheet portion 301B takes the same disc form as the form of an optical disc, as shown in FIGS. 6 and 7.

Finally, as shown in FIG. 5(e), the residual portion 303B of the adhesive sheet 3B is removed. As shown in FIGS. 6 and 7, the laminate sheet 1B produced in this manner is constituted by the long release sheet 2B, the disc-form cover sheet portions 301B constituted by the adhesive layer 31B and the base material 32B and provided continuously in a central portion in the direction of width of the release surface of the release sheet 2B, the strip-form protective portions 302B constituted by the adhesive layer 31B and base material 32B and provided on the both side portions in the direction of width of the release surface of the release sheet 2B, and the strip-form protective portions 41B provided on the protective portions 302B.

In this laminate sheet 1B, the protective portions 41B and protective portions 302B are combined to form a protective member 5B. The protective member 5B is thicker than the thickness of the cover sheet portion 301B by the thickness of the protective portion 41B.

When the laminate sheet 1B described above is wound into a roll form as shown in FIG. 8, the protective member 5B which is thicker than the thickness of the cover sheet portion 301B is provided on the laminate sheet 1B, and therefore a slight gap is produced between the surface of the cover sheet portion 301B and the back surface of the release sheet 2B which is wound thereon. Moreover, the protective member 5B is positioned so as not to overlap the cover sheet portion 301B. Thus the contour parts of other cover sheet portions 301B and the protective member 5B do not press forcefully upon the cover sheet portion 301B, and as a result traces caused by winding pressure can be reliably prevented from forming on the cover sheet portion 301B.

Further, when foreign matter such as minute dust particles becomes trapped between the layers of the wound laminate sheet 1B during the winding of the laminate sheet 1B, the gap exists between the surface of the cover sheet portion 301B and the back surface of the release sheet 2B, and thus, as long as the diameter of the foreign matter is smaller than the size of the gap, depressions formed in the cover sheet portion 301B by the foreign matter are prevented. Moreover, in a conventional roll, even if only one foreign matter particle becomes trapped, the effect thereof causes depressions to form in a plurality of overlapped cover sheets. In the roll of the laminate sheet 1B according to this embodiment, however, the release sheet 2B and cover sheet portion 301B can be displaced in the radial direction of the roll by the size of the gap, and thus even if a foreign matter particle with a larger diameter than the size of the gap becomes attached on the cover sheet portion 301B, the effect thereof on other cover sheet portions 301B can be suppressed such that depressions caused by the foreign matter particle can be prevented from forming on a plurality of the cover sheet portions 301B.

According to the laminate sheet 1B of this embodiment as described above, defects which may be formed in the cover sheet portions 301B when the laminate sheet 1B is wound into a roll can be dramatically reduced.

Third Embodiment

FIGS. 9(a) through (d) are sectional views showing a producing method for a laminate sheet according to a third embodiment of the present invention.

In order to produce a laminate sheet 1C according to this embodiment, first, as shown in FIG. 9(a), an adhesive layer 31C and a base material 32C are successively laminated onto a release surface of a long release sheet 2C. Note that the adhesive layer 31C and base material 32C together constitute an adhesive sheet 3C.

Similar materials to those used for the release sheet 2A, adhesive layer 31A, and base material 32A of the laminate sheet 1A according to the first embodiment described above may be used as the materials for the release sheet 2C, adhesive layer 31C, and base material 32C.

Once the release sheet 2C and adhesive sheet 3C have been laminated as shown in FIG. 9(a), cuts which do not reach the release sheet 2C are made in the adhesive sheet 3C as shown in FIG. 9(b), whereby the adhesive sheet 3C is divided into cover sheet portions 301C, bolster portions 302C, and a residual portion 303C. The central portion of the cover sheet portion 301C is punched out to form a central hole portion 304C.

The planar forms of the cover sheet portion 301C and bolster portion 302C are similar to the planar forms of the cover sheet portion 301A and bolster portion 302A in the laminate sheet 1A according to the first embodiment described above (see FIGS. 2, 3).

The residual portion 303C of the adhesive sheet 3C which is formed as a result of the cutting described above is removed as shown in FIG. 9(c), and finally, as shown in FIG. 9(d), strip-form protective portions 41C are laminated onto the outside edge portions of the bolster portion 302A. These protective portions 41C may be constituted by a similar sheet to that used for the protective sheet 4A of the laminate sheet 1A according to the first embodiment, or may be formed by ink printing or coating application.

There are no particular limitations on the type of ink or coating compound and the printing or application method. For example, an ink or coating containing a vehicle such as urethane resin or acrylic resin may be printed using a method such as lithography or relief-printing, or applied using a method such as spraying or brushing.

When the protective portions 41C are formed by an ink or coating as described above, the thickness of the dried film is similar to that noted above, preferably between 5 and 100 μm, and more preferably between 25 and 75 μm.

Note that in this embodiment, the step of laminating the protective portions 41C is performed last, but the present invention is not limited thereto, and the lamination step may be performed at any stage during the producing process of the laminate sheet 1C.

The laminate sheet 1C produced in the manner described above is constituted by the long release sheet 2C, the disc form cover sheet portions 301C constituted by the adhesive layer 31C and the base material 32C and provided continuously in the central portion in the direction of width of the release surface of the release sheet 2C, the wave form bolster portion 302C constituted by the adhesive layer 31C and base material 32C and provided on the both side portions in the direction of width of the release surface of the release sheet 2C, and the strip-form protective portions 41C provided on the outside edge portions of the bolster portion 302C (see FIGS. 2, 3).

In this laminate sheet 1C, the protective portions 41C and the adhesive sheet 3C (bolster portion 302C) positioned below the protective portions 41C are combined to form a protective member 5C. The protective member 5C is thicker than the thickness of the cover sheet portion 301C by the thickness of the protective portion 41C.

Similarly to the laminate sheet 1A according to the first embodiment, when the laminate sheet 1C described above is wound into a roll form, traces caused by winding pressure and depressions caused by foreign matter are prevented from forming on the cover sheet portion 301C.

Fourth Embodiment

Figure 10:
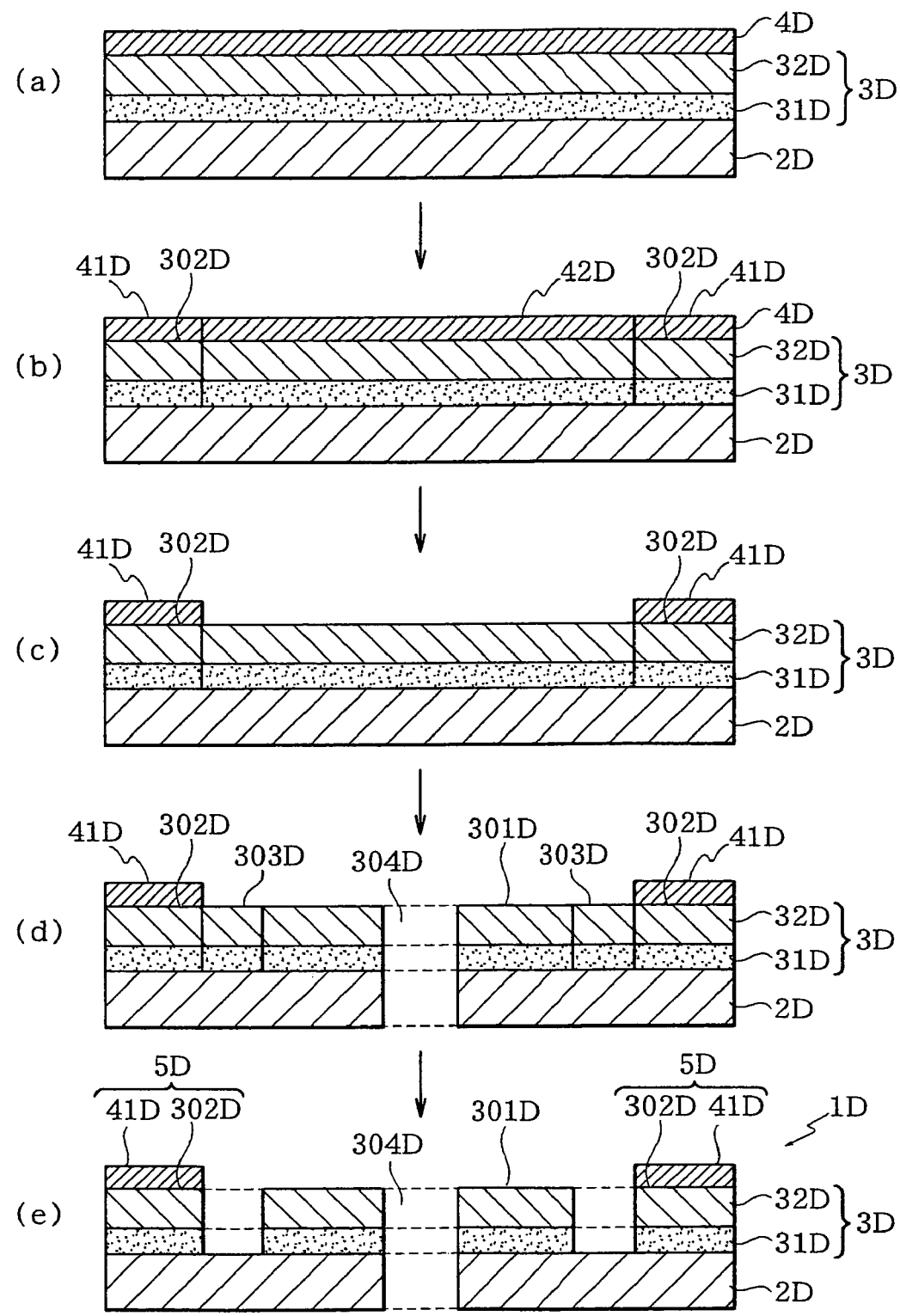
FIG. 10 is a sectional view showing a producing method for a laminate sheet according to a fourth embodiment of the present invention.
Figure 11:
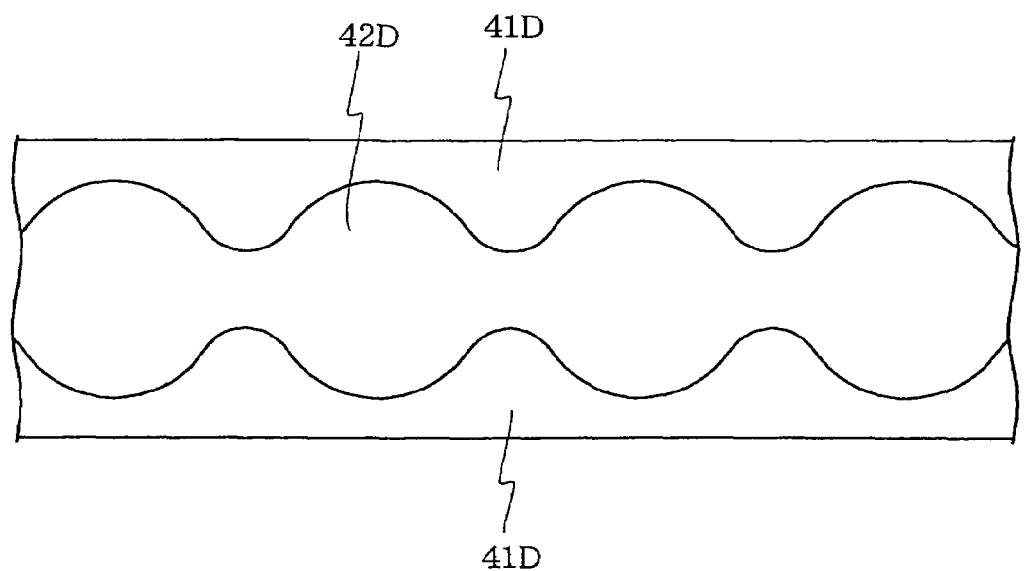
FIG. 11 is a plan view of the laminate sheet during production.
Figure 12:
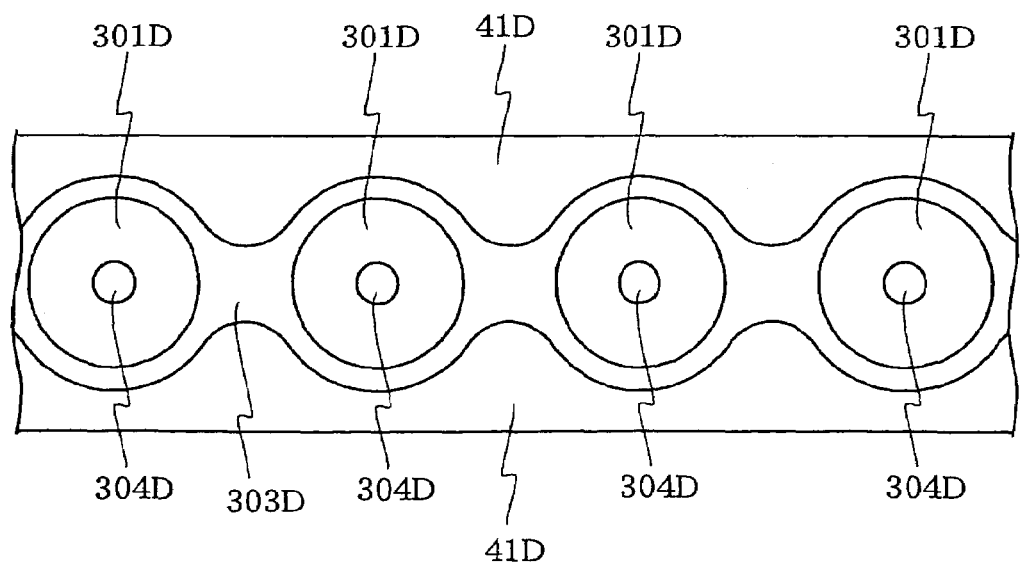
FIG. 12 is a plan view of the laminate sheet during production.
Figure 13:
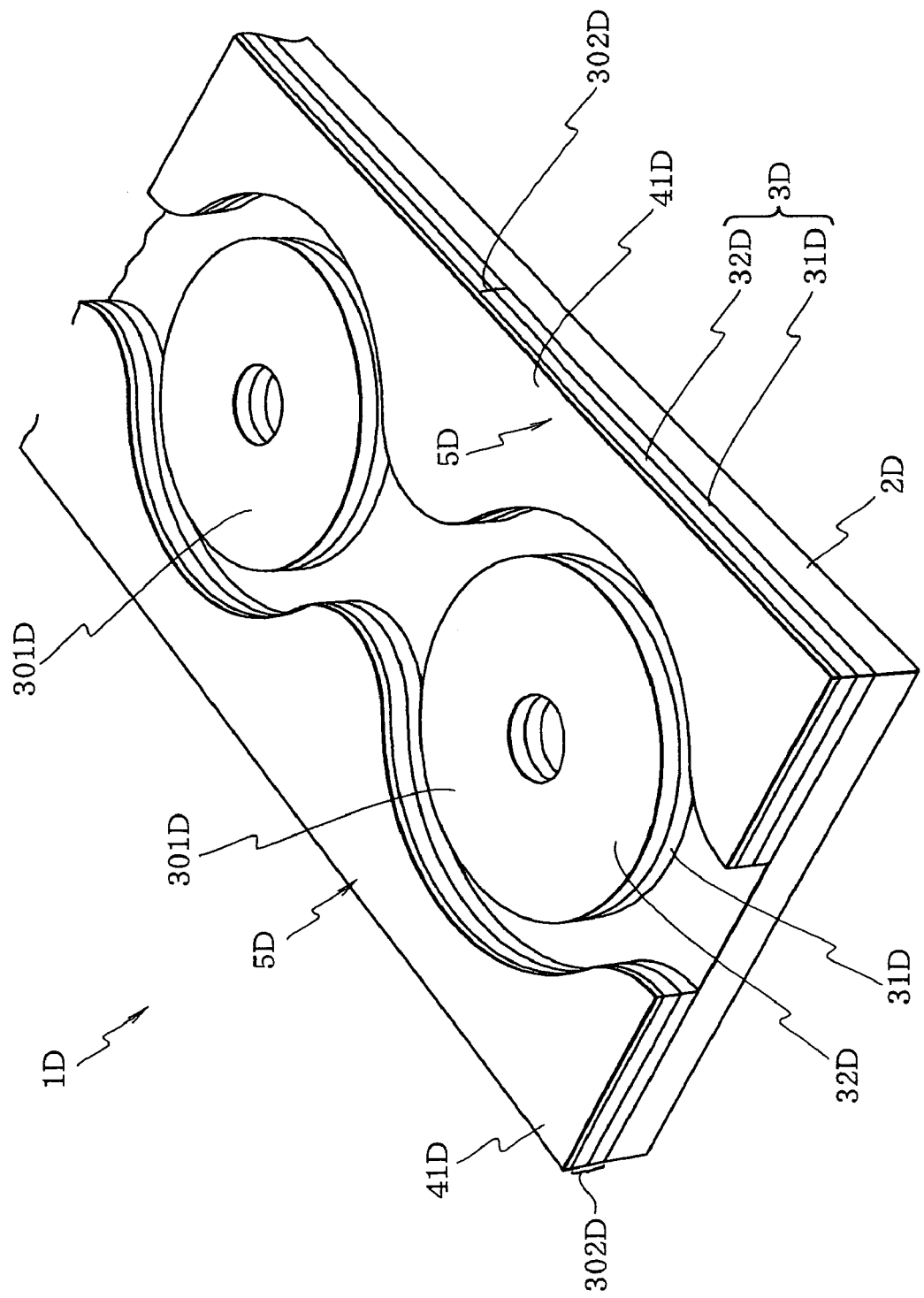
FIG. 13 is a perspective view of the laminate sheet according to the fourth embodiment of the present invention.
Figure 14:
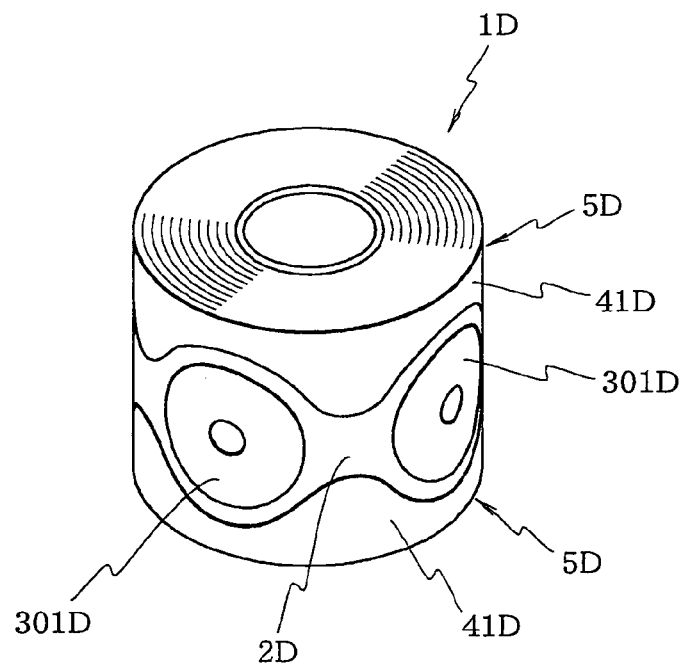
FIG. 14 is a perspective view of a laminate sheet roll according to the fourth embodiment of the present invention.

FIGS. 10(a) through 10(e) are sectional views showing a producing method for a laminate sheet according to a fourth embodiment of the present invention, FIGS. 11 and 12 are plan views of the laminate sheet during production, FIG. 13 is a perspective view of the laminate sheet according to the fourth embodiment of the present invention, and FIG. 14 is a perspective view of a laminate sheet roll according to the fourth embodiment of the present invention.

In order to produce a roll of a laminate sheet 1D according to this embodiment, first, as shown in FIG. 10(a), an adhesive layer 31D, a base material 32D, and a protective sheet 4D are successively laminated onto a release surface of a long release sheet 2D. Note that the adhesive layer 31D and base material 32D together constitute an adhesive sheet 3D.

Similar materials to those used for the release sheet 2A, adhesive layer 31A, base material 32A, and protective sheet 4A of the laminate sheet 1A according to the first embodiment described above may be used as the materials for the release sheet 2D, adhesive layer 31D, base material 32D, and protective sheet 4D.

Once the release sheet 2D, adhesive sheet 3D, and protective sheet 4D have been laminated as shown in FIG. 10(a), cuts which do not reach the release sheet 2D are made in the protective sheet 4D and adhesive sheet 3D as shown in FIG. 10(b), whereby the protective sheet 4D is divided into protective portions 41D on both side portions in the direction of width and a residual portion 42D in a central portion in the direction of width, and the adhesive sheet 3D is divided into protective portions 302D on both side portions in the direction of width and a central portion in the direction of width. The cuts made in the protective sheet 4D and adhesive sheet 3D may be made according to a typical method, for example using a punching machine or the like.

As shown in FIG. 11, the planar form of the protective portions 41D of the protective sheet 4D and the protective portions 302D of the adhesive sheet 3D is a wave form comprised of alternating convex arcs and concave arcs in respect of a central line in the direction of width of each sheet which is symmetrical along an axis constituted by the central line in the direction of width of each sheet.

The residual portion 42D of the protective sheet 4D which is formed as a result of the above cuts is removed as shown in FIG. 10(c) to form the protective portions 41D.

Next, as shown in FIG. 10(d), cuts which do not reach the release sheet 2D are made in the adhesive sheet 3D, whereby the central portion of the adhesive sheet 3D in the direction of width is divided into cover sheet portions 301D and a residual portion 303D to form the adhesive sheet 3D into a predetermined shape. The central portion of the cover sheet portion 301D is punched out to form a central hole portion 304D. Cutting and punching of the adhesive sheet 3D may be performed according to a typical method, for example using a punching machine or the like.

As shown in FIG. 12, the planar form of the cover sheet portion 301D becomes an identical disc form to the form of an optical disc. The cover sheet portions 301D are positioned between the opposing concave arcs which are formed in the protective portions 41D of the protective sheet 4D and the protective portions 302D of the adhesive sheet 3D in respect of the central line in the direction of width of each sheet. In other words, the protective portions 41D of the protective sheet 4D and the protective portions 302D of the adhesive sheet 3D run along the outer periphery of the cover sheet portions 301D, receding toward the both side portions in the direction of width of each sheet and protruding between the cover sheet portions 301D so as to intrude between the cover sheet portions 301D.

Next, as shown in FIG. 10(e), the residual portion 303D of the adhesive sheet 3D is removed to form the cover sheet portion 301D and protective portions 302D. As shown in FIG. 13, the laminate sheet 1D produced in this manner is constituted by the long release sheet 2D, the disc form cover sheet portions 301D constituted by the adhesive layer 31D and base material 32D and provided in a continuous plurality in the central portion in the direction of width of the release surface of the release sheet 2D, and a wave-form protective member 5D constituted by the protective portions 41D of the protective sheet 4D and the protective portions 302D of the adhesive sheet 3D and provided on the both side portions in the direction of width of the release surface of the release sheet 2D.

Note that there are no particular limitations on the distance between the plurality of cover sheet portions 301D (the width of the narrowest portion of the interval therebetween), but in consideration of a case in which the cover sheet portion 301D is stuck to the recording layer or the like of an optical disc using an mounting device, this distance is preferably between approximately 1 and 20 mm.

In the laminate sheet 1D described above, the protective member 5D is thicker than the thickness of the cover sheet portion 301D by the thickness of the protective portion 41D (protective sheet 4D).

As shown in FIG. 14, when the laminate sheet 1D is wound into a roll form, the protective member 5D which is thicker than the thickness of the cover sheet portion 301D is provided on the laminate sheet 1D, and thus a slight gap is produced between the surface of the cover sheet portion 301D and the back surface of the release sheet 2D which is wound thereon. Thus the contour parts of other cover sheet portions 301D do not press forcefully upon the cover sheet portion 301D, and as a result traces caused by winding pressure are prevented from forming on the cover sheet portion 301D.

Further, in the roll of the laminate sheet 1D, the part at which the protective members 5D overlap bears the greatest winding pressure, thereby reducing the winding pressure on the part at which the protective member 5D and the cover sheet portion 301D overlap and preventing traces caused by the protective member 5D from forming on the cover sheet portion 301D.

Further, when foreign matter such as minute dust particles becomes trapped between the layers of the wound laminate sheet 1D during the winding of the laminate sheet 1D, the gap exists between the surface of the cover sheet portion 301D and the back surface of the release sheet 2D, and thus, as long as the diameter of the foreign matter is smaller than the size of the gap, depressions formed on the cover sheet portion 301D by the foreign matter are prevented. Moreover, in a conventional roll, even if only one foreign matter particle becomes trapped, the effect thereof causes depressions to form in a plurality of overlapped cover sheets. In the roll of the laminate sheet 1D according to this embodiment, however, the release sheet 2D and cover sheet portion 301D can be displaced in the radial direction of the roll by the size of the gap, and thus even if a foreign matter particle with a larger diameter than the size of the gap becomes attached to the cover sheet portion 301D, the effect thereof on other cover sheet portions 301D can be suppressed such that depressions caused by the foreign matter particle can be prevented from forming on a plurality of the cover sheet portions 301D. According to the laminate sheet 1D of this embodiment as described above, defects which may be formed in the cover sheet portions 301D when the laminate sheet 1D is wound into a roll can be dramatically reduced.

In the roll of the laminate sheet 1D here, the protective member 5D partially overlaps the cover sheet portion 301D. By causing the protective member 5D to partially overlap the cover sheet portion 301D in this manner, the area of surface contact between the surfaces of the protective member 5D and the back surface of the release sheet 2D is ensured to a certain degree, and since the part of the roll at which the protective members 5D overlap bears the greatest winding pressure, stability as a roll is high and the possibility of the roll collapsing during use, transportation, and so on is low.

Figure 15:
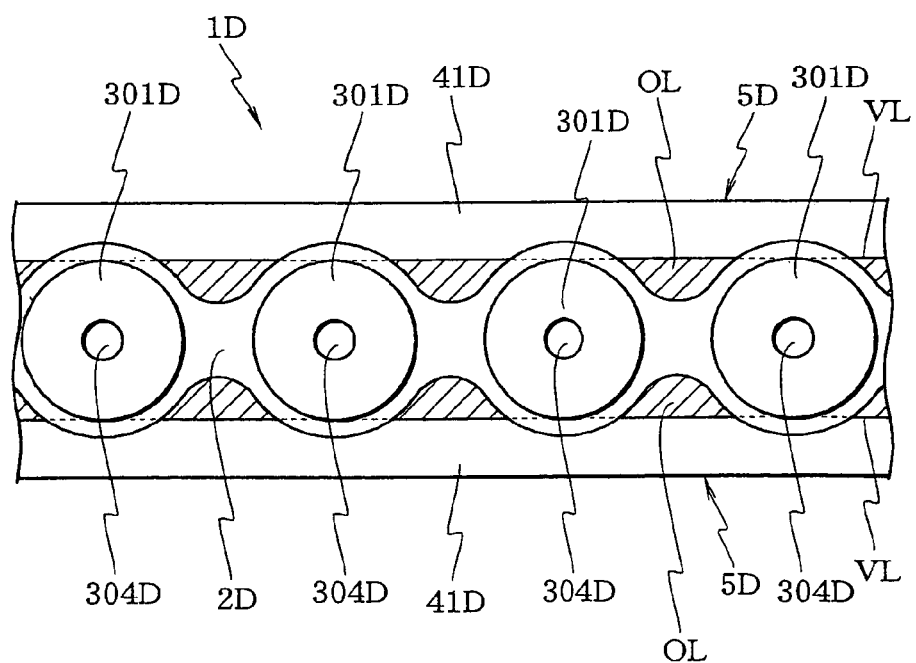
FIG. 15 is a plan view of the laminate sheet according to the fourth embodiment of the present invention.

The surface area of the part at which the protective member 5D and cover sheet portion 301D overlap is preferably no more than 50% of the surface area of the cover sheet portion 301D, and more preferably between 0.5% and 50%. If the surface area exceeds 50%, the number of cover sheet portions 301D formed on the laminate sheet 1D decreases, causing a deterioration in yield. If the surface area is less than 0.5%, the effect described above of an improvement in the stability of the roll becomes difficult to obtain. Note that in this embodiment, as shown in FIG. 15, a part (the part indicated by diagonal shading in FIG. 15) of the protective member 5D of the laminate sheet 1D which exists further inside in the direction of width than a virtual straight line VL which connects the outermost edge in the direction of width of the plurality of cover sheet portions 301D becomes an overlapping part OL between the protective member 5D and cover sheet portion 301D, and the surface area of the overlapping part OL between two adjacent cover sheet portions 301D is preferably no more than 50% of the surface area of one cover sheet portion 301D, and more preferably between 0.5% and 50% thereof.

Other Embodiments

The embodiments described above are provided to facilitate understanding of the present invention, and do not limit the present invention. Accordingly, the elements disclosed in the above embodiments are intended to include all design modifications, equivalents, and so on pertaining to the technical scope of the present invention.

Figure 16:
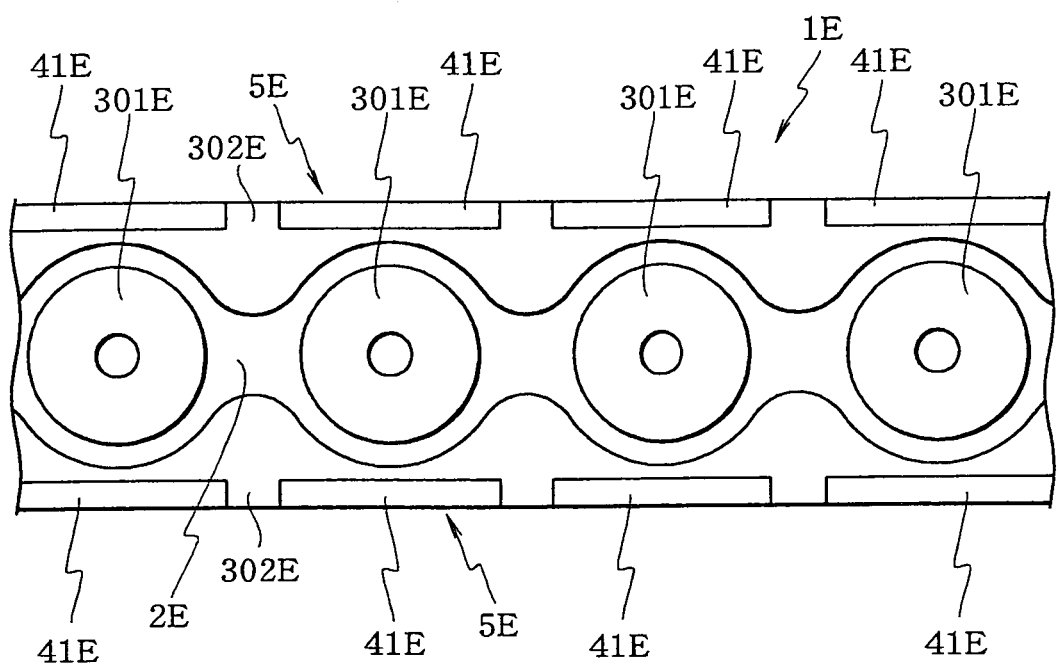
FIG. 16 is a plan view of a laminate sheet according to another embodiment of the present invention.

For example, the protective portions 41A, 41C of the laminate sheet 1A, 1C may be provided as protective portions 41E of a laminate sheet 1E shown in FIG. 16, only on either side of a cover sheet portion 301E, and the portions between the cover sheet portions 301E may be disconnected such that the protective portions 41E are provided discontinuously.

Figure 17:
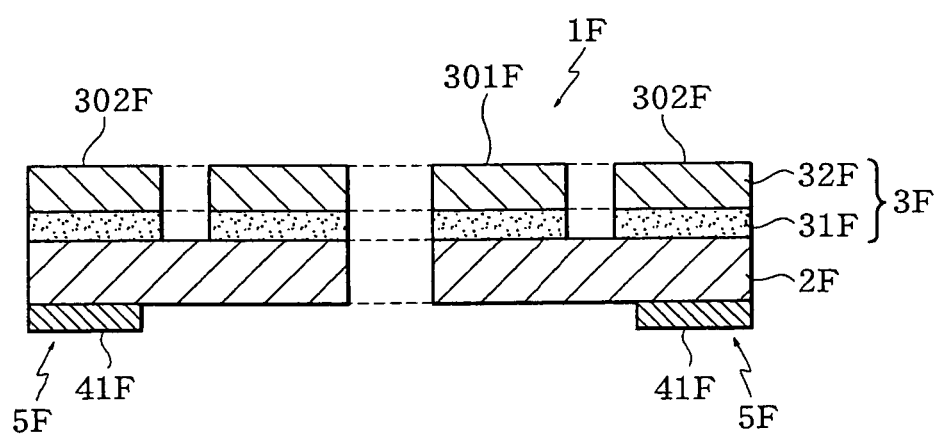
FIG. 17 is a sectional view of a laminate sheet according to a further embodiment of the present invention.

Also, the protective portions 41A, 41C of the laminate sheets 1A, 1C may be provided as protective portions 41F of a laminate sheet 1F shown in FIG. 17, on either side in the direction of width of the back surface of the release sheet 2F. In this laminate sheet 1F, the protective portions 41F and an adhesive sheet 3F (bolster portion 302F) positioned above the protective portions 41F are combined to form a protective member 5F. The protective member 5F is thicker than the thickness of a cover sheet portion 301F by the thickness of the protective portion 41F.

Further, rather than forming the protective portions 41D on the laminate sheet 1D from the protective sheet 4D having the same form as the release sheet 2D, the protective portions 41D may be formed by laminating a sheet (to be referred to hereinafter as a "specific form sheet") having an identical form to the protective portions 302D of the base material 32D onto the base material 32D, or by printing ink or applying a coating onto the base material 32D in an identical form to the protective portions 302D of the base material 32D. Lamination of the specific form sheet, printing, or application may be performed after the lamination of the release sheet 2D, adhesive layer 31D, and base material 32D and before the cutting process, after the cutting process, or on the base material 32D prior to lamination thereof on the release sheet 2D.

A similar material to that used for the protective sheet 4D may be used as the material for the specific form sheet. There are no particular limitations on the type of ink or coating compound and the printing or application method. For example, an ink or coating containing a vehicle such as urethane resin or acrylic resin may be printed using a method such as lithography or relief-printing, or applied using a method such as spraying. When the protective portions 41D are formed by ink printing or coating application, the thickness of the dried film is similar to that when a sheet is used, preferably between 5 and 100 µm, and more preferably between 25 and 75 µm.

The protective portions 41D (including the specific form sheet and the printed or applied item described above) of the laminate sheet 1D may also be provided on the back surface of the release sheet 2D, for example.

EXAMPLES

The present invention will be described more specifically below using examples and the like. However, the scope of the present invention is not limited to or by these examples and the like.

First Example 1 part by weight of a polyisocyanate compound (Takenate D-140N, manufactured by Takeda Chemical Industries Ltd.) was added as a cross-linking agent to 100 parts by weight of a copolymer which was obtained by copolymerizing 97 parts by weight of n-butyl acrylate and 3 parts by weight of 2-hydroxyethyl acrylate, and 200 parts by weight of toluene were added as a solvent to obtain a coating agent of pressure sensitive adhesive.

Meanwhile, a protective sheet (PAC2-70, manufactured by Sun A Kaken Co., Ltd., thickness: 70 µm) constituted by an ethylene vinyl acetate type pressure sensitive adhesive layer provided on a polyethylene base material was stuck to one face of a polycarbonate film (Pure Ace C110-75, manufactured by Teijin Ltd., thickness: 75 µm) serving as a base material to obtain a protective sheet-attached base material.

The aforementioned coating agent of pressure sensitive adhesive was applied using a knife coater to a release surface of a release sheet (SP-PET3811, manufactured by LINTEC Corporation, thickness: 38 µm) constituted by a silicone type release agent applied to one face of a polyethylene terephthalate film so as to reach a thickness of 25 µm following drying, and the release sheet was dried for three minutes at 100° C. The polycarbonate film side of the protective sheet-attached base material described above was pressed onto the pressure sensitive adhesive layer formed in this manner, and thus a long laminate body with a width of 150 mm and a length of 100 m was produced.

Next, the protective sheet was divided into protective portions (width: 10 mm) on the both side portions in the direction of width and a residual portion in the center of the direction of width as shown in FIG. 1(b), using a punching machine (Mark Andy 910, manufactured by Mark Andy Inc.). The residual portion was removed as shown in FIG. 1(c).

The base material and pressure sensitive adhesive layer (adhesive sheet) were divided into disc-form cover sheet portions (diameter: 120 mm, 500 sheets), wave form bolster portions, and a residual portion as shown in FIG. 1(d), using the above punching machine. The central portion of the cover sheet portion was then punched out to form a central hole portion, and the residual portion was removed as shown in FIG. 1(e).

In the laminate sheet produced in this manner (see FIGS. 2, 3), the protective member is thicker than the adhesive sheet by 70 µm (the thickness of the protective sheet).

Finally, the obtained laminate sheet was wound onto a three-inch diameter ABS (acrylonitrile-butadiene-styrene resin) core at an initial winding tension of 12N and a taper ratio of 50% to form a roll (see FIG. 4).

Second Example

A protective sheet, a base material, and a pressure sensitive adhesive layer of a long laminate body produced in a similar manner to the first example were divided into protective portions (width: 10 mm) on the both side portions in the direction of width and a central portion in the direction of width as shown in FIG. 5(b), using a punching machine (Mark Andy 910, manufactured by Mark Andy Inc.). The central portion in the direction of width of the protective sheet was then removed as shown in FIG. 5(c).

The central portion in the direction of width of the base material and pressure sensitive adhesive layer (adhesive sheet) were divided into disc-form cover sheet portions (diameter: 120 mm, 500 sheets) and a residual portion as shown in FIG. 5(d), using the above punching machine. The central portion of the cover sheet portion was then punched out to form a central hole portion, and the residual portion was removed as shown in FIG. 5(e).

In the laminate sheet produced in this manner (see FIGS. 6, 7), the protective member is thicker than the adhesive sheet by 70 µm (the thickness of the protective sheet).

Finally, the obtained laminate sheet was wound onto a core under the same winding conditions as those of the first example to form a roll (see FIG. 8).

Third Example

An acrylic pressure sensitive adhesive (PL Shin, manufactured by LINTEC Corporation) was applied at a thickness of 20 µm to a polyethylene terephthalate film (width: 10 mm, thickness: 25 µm) serving as a base material to form a pressure sensitive adhesive layer, thus obtained an adhesive tape.

The coating agent of pressure sensitive adhesive prepared in the first example was applied using a knife coater to a release surface of a release sheet (SP-PET3811, manufactured by LINTEC Corporation, thickness: 38 µm) constituted by a silicone type release agent applied to one face of the polyethylene terephthalate film so as to reach a thickness of 25 µm following drying, and the release sheet was dried for three minutes at 100° C. A base material constituted by a polycarbonate film (Pure Ace C110-75, manufactured by Teijin Ltd., thickness: 75 µm) was pressed onto the pressure sensitive adhesive layer formed in this manner, and thus a long laminate body with a width of 150 mm and a length of 100 m was produced.

Figure 9:
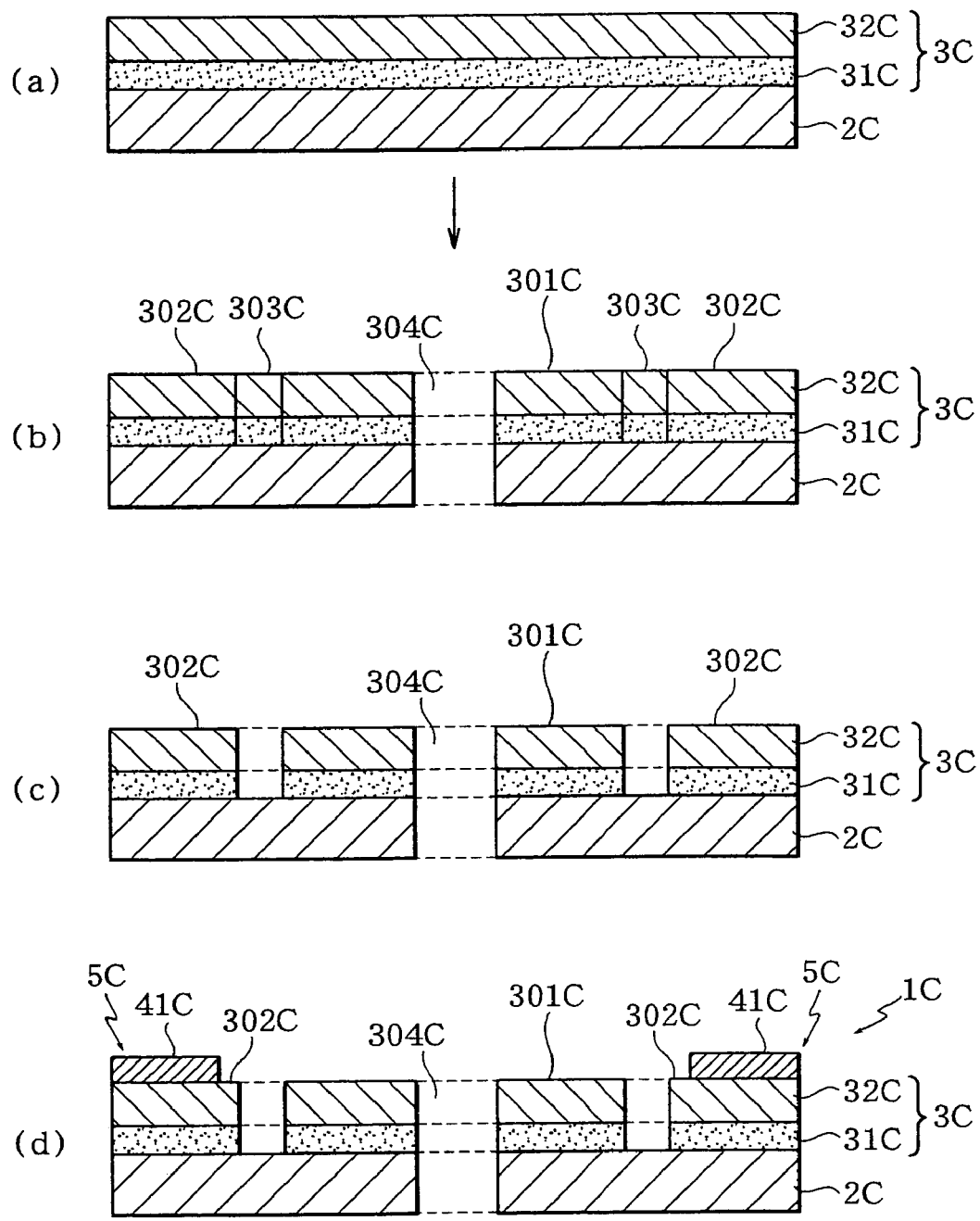
FIG. 9 is a sectional view showing a producing method for a laminate sheet according to a third embodiment of the present invention.

Next, the base material and pressure sensitive adhesive layer (adhesive sheet) were divided into disc form cover sheet portions (diameter: 120 mm, 500 sheets), wave form bolster portions, and a residual portion as shown in FIG. 9(*b*), using a punching machine (Mark Andy 910, manufactured by Mark Andy Inc.). The central portion of the cover sheet portion was then punched out to form a central hole portion, and the residual portion was removed as shown in FIG. 9(*c*).

Then, as shown in FIG. 9(*d*), the aforementioned adhesive tape was stuck to the outside edge portions of the bolster portion to form protective portions. In the laminate sheet produced in this manner (see FIGS. 2, 3), the protective member is thicker than the adhesive sheet by 45 μm (the thickness of the adhesive tape).

Finally, the obtained laminate sheet was wound onto a core under the same winding conditions as those of the first example to form a roll (see FIG. 4).

Fourth Example

The protective sheet, base material, and pressure sensitive adhesive layer of a long laminate body produced in a similar manner to the first example were divided into wave form side portions on either side in the direction of width and a central portion in the direction of width as shown in FIGS. 10(*b*) and 11, using a punching machine (Mark Andy 910, manufactured by Mark Andy, Inc.). The central portion in the direction of width of the protective sheet was then removed as shown in FIG. 10(*c*).

The central portion in the direction of width of the base material and pressure sensitive adhesive layer (adhesive sheet) were divided into disc-form cover sheet portions (diameter: 120 mm, 500 sheets) and a residual portion as shown in FIGS. 10(*d*) and 12, using the above punching machine. The central portion of the cover sheet portion was then punched out to form a central hole portion, and the residual portion was removed as shown in FIGS. 10(*e*) and 13.

In the laminate sheet produced in this manner (see FIG. 13), the protective member is thicker than the adhesive sheet by 70 μm (the thickness of the protective sheet)

Finally, the obtained laminate sheet was wound onto a core under the same winding conditions as those of the first example to form a roll (see FIG. 14). In this laminate sheet roll, the surface area of the overlapping part between the wave form protective sheet and the cover sheet portion was 13.5% of the surface area of the cover sheet portion. When the roll was removed from the winding device and transported, the roll did not collapse and no problems were encountered during operations.

Fifth Example

Figure 18:
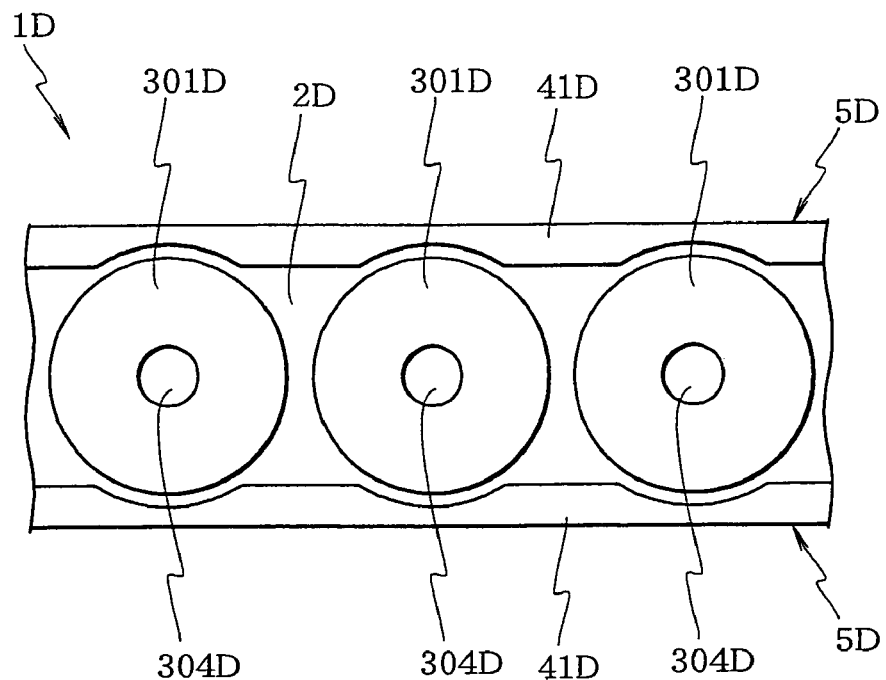
FIG. 18 is a plan view of a laminate sheet produced in a fifth example.

A laminate sheet roll was produced in a similar fashion to the fourth example, as shown in FIG. 18. A protective member in this laminate sheet runs along the outer periphery of the cover sheet portions, receding toward the both side portions in the direction of width of the laminate sheet, and comprising trapezoid protrusions between the cover sheet portions which intrude slightly between the cover sheet portions. The protective member is thicker than the adhesive sheet by 70 μm (the thickness of the protective sheet).

In this laminate sheet roll, the surface area of the overlapping part between the protective member and the cover sheet portion was 2% of the surface area of the cover sheet portion. When the roll was removed from the winding device and transported, the roll did not collapse and no problems were encountered during operations.

Sixth Example

A pressure sensitive adhesive layer was formed on the release surface of a release sheet in a similar manner to the fourth example, and a similar base material to the base material of the first example (a polycarbonate film without a protective sheet) was pressed onto the pressure sensitive adhesive layer. Then, a wave form ink layer serving as protective portions was formed by printing on the both side portions in the direction of width of the base material in the obtained laminate sheet.

A Mark Andy 910 (relief-printing system), manufactured by Mark Andy Inc., was used as a printing press, and UV Flexo Blue CF, manufactured by T&K TOKA CO., LTD., was used as the ink. The thickness of the ink layer was set to 5 μm.

Figure 19:
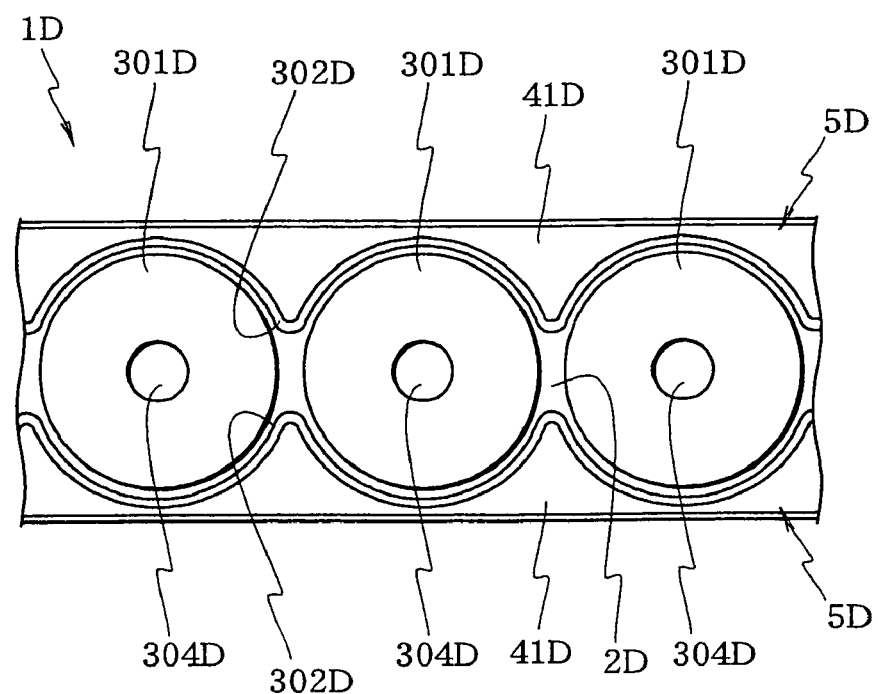
FIG. 19 is a plan view of a laminate sheet produced in a sixth example.
Figure 20:
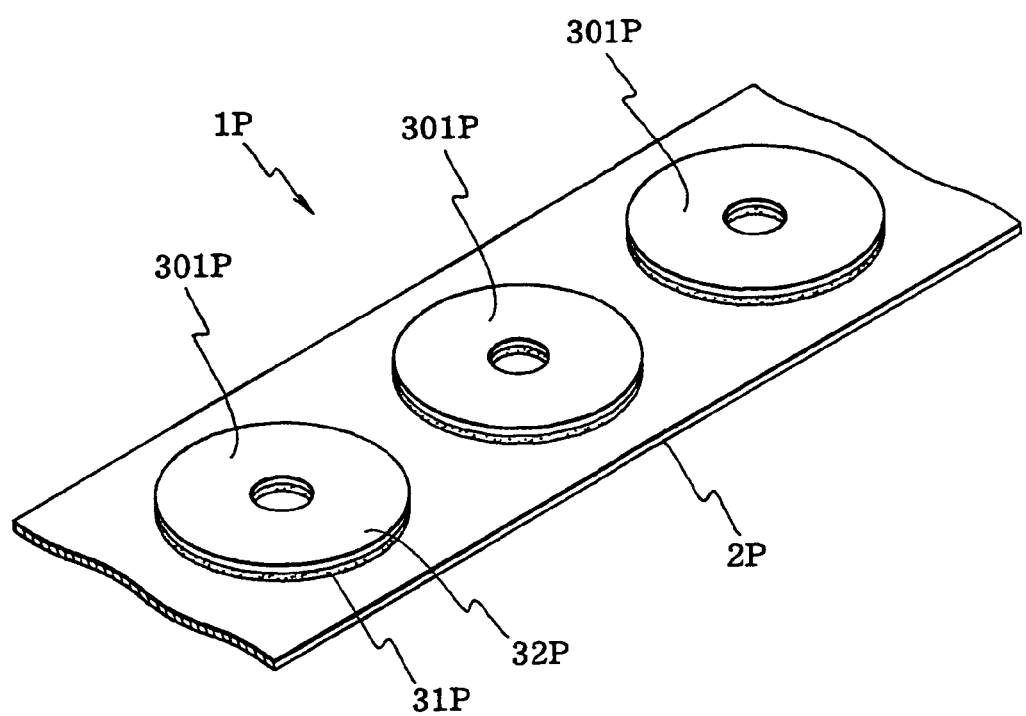
FIG. 20 is a perspective view of a conventional laminate sheet.
Figure 21:
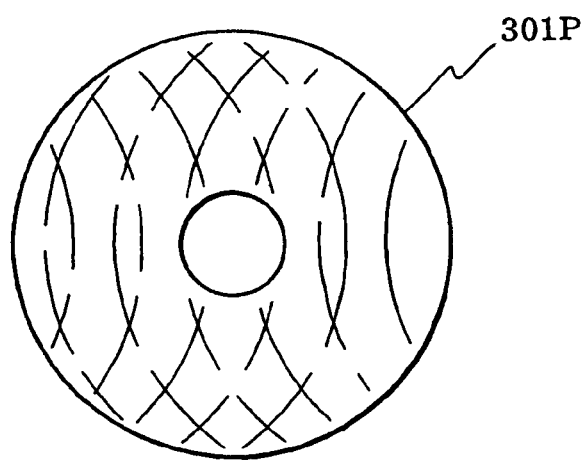
FIG. 21 is a plan view of a cover sheet portion in a conventional laminate sheet.

Next, similarly to the fourth example, the base material and pressure sensitive adhesive layer were divided into wave form side portions on either side in the direction of width, cover sheet portions (diameter: 120 mm, 500 sheets), and a residual portion. The central portion of the cover sheet portion was then punched out to form a central hole portion, and the residual portion was removed to form the laminate sheet shown in FIG. 19. The laminate sheet was then wound into a roll. In the obtained laminate sheet, the protective member was thicker than the adhesive sheet by 5 μm (the thickness of the ink layer) Note that the ink layer (protective portion) in this laminate sheet was printed in a form which intrudes inward by 1 mm from the edge of each side portion in the direction of width of the base material, as shown in FIG. 19.

In this laminate sheet roll, the surface area of the overlapping part between the wave-form protective portions and the cover sheet portion was 12.4% of the surface area of the cover sheet portion. When the roll was removed from the winding device and transported, the roll did not collapse and no problems were encountered during operations.

First Comparative Example

A laminate sheet was produced in a similar manner to the first example except that the residual portion of the protective sheet was not removed. The obtained laminate sheet was wound under similar winding conditions to those of the first example to form a roll.

Second Comparative Example

A laminate sheet was produced in a similar manner to the third example except that the adhesive tape serving as a protective portion was not stuck. The obtained laminate sheet was wound under similar winding conditions to those of the first example to form a roll.

Third Comparative Example

A laminate sheet was produced in a similar manner to the fourth example except that the protective sheet was not stuck to the base material. The obtained laminate sheet was wound under similar winding conditions to those of the first example to form a roll.

Experiential Example

The laminate sheet formed into a roll in the first through sixth examples and first through third comparative examples was placed for one week in an atmosphere of 23° C. and 50% relative humidity, after which the state of the cover sheet portion was observed using a mercury vapor lamp projection method. Mercury vapor lamp projection was performed by disposing the adhesive sheet (cover sheet portion) peeled away from the release sheet between a mercury vapor lamp (light source: SX-01250HQ, mercury vapor lamp power source: BA-H250, manufactured by Ushio Inc.) and a white projection screen and visually observing the projection of the adhesive sheet on the projection screen. The distance between the mercury vapor lamp and the adhesive sheet was set at 170 cm, and the distance between the adhesive sheet and the projection screen was set at 30 cm.

As a result, no defects whatsoever could be seen in the cover sheet portion of the laminate sheets in the first through sixth examples, but in the cover sheet portion of the laminate sheets in the first through third comparative examples, traces of the contours of other cover sheet portions or the bolster portion, or depressions caused by foreign matter were observed.

INDUSTRIAL APPLICABILITY

According to the laminate sheet of the present invention, defects which may be formed on an adhesive sheet when the laminate sheet is wound into a roll can be reduced, and according to the laminate sheet roll of the present invention, defects which may be formed on the adhesive sheet can be reduced. According to the producing method for a laminate sheet of the present invention, a laminate sheet which is capable of reducing the defects that may be formed on an adhesive sheet when the laminate sheet is wound into a roll is obtained, and according to the producing method for a laminate sheet roll of the present invention, a laminate sheet roll which is capable of reducing the defects that may be formed on an adhesive sheet is obtained. In other words, the present invention may be used to obtain an adhesive sheet in which defects are undesirable, for example an optical discs producing adhesive sheet.

The invention claimed is:

1. A producing method for a laminate sheet, comprising the steps of:
    laminating an adhesive sheet, which includes a base material and an adhesive layer, and a protective sheet successively onto a long release sheet;
    cutting said protective sheet such that when the obtained laminate sheet is wound into a roll, remaining protective sheet and a target form of the adhesive sheet do not overlap;
    removing unnecessary portions of said protective sheet to form a protective member comprising the remaining protective sheet and the adhesive sheet positioned therebelow;
    cutting said adhesive sheet into the target form; and
    removing unnecessary portions of said adhesive sheet such that the target form of the adhesive sheet remains.

2. A producing method for a laminate sheet, comprising the steps of:
    laminating an adhesive sheet, which includes a base material and an adhesive layer, and a protective sheet successively onto a long release sheet;
    cutting said protective sheet such that when the obtained laminate sheet is wound into a roll, remaining protective sheet and a target form of the adhesive sheet partially overlap;
    removing unnecessary portions of said protective sheet to form a protective member comprising the remaining protective sheet and the adhesive sheet positioned therebelow and such that the protective sheet is not positioned on the portion of the adhesive sheet to be cut into the target form;
    cutting said adhesive sheet into the target form; and
    removing unnecessary portions of said adhesive sheet such that the target form of the adhesive sheet remains and such that the protective member and the target form of the adhesive sheet are located in different positions on the release sheet, and the protective member and the target form are spaced apart laterally from one another when the laminate sheet is in a planar state.

3. The producing method for a laminate sheet according to claim 1 or 2, wherein said protective sheet and said adhesive sheet are cut integrally such that the cuts do not reach said release sheet when said protective sheet is cut.

4. A producing method for a laminate sheet, comprising the steps of:
    laminating an adhesive sheet, which includes a base material and an adhesive layer, onto a long release sheet;
    providing protective portions on said adhesive sheet at an arbitrary stage to form protective members that include said protective portions and corresponding portions of the adhesive sheet positioned therebelow;
    cutting said adhesive sheet into a target form such that when the obtained laminate sheet is wound into a roll, said protective portions and the target form do not overlap; and
    removing unnecessary portions of said adhesive sheet to form the target form.

5. A producing method for a laminate sheet roll, comprising the steps of producing a laminate sheet using the laminate sheet producing method according to claim 1, 2 or 4 and then winding the obtained laminate sheet into a roll.

6. The method of claim 1, wherein the protective member is one of two protective members that are formed when the unnecessary portions of said protective sheet are removed, and the protective members are located on opposite lateral sides of the release sheet, and the target form is located between the protective members.

7. The method of claim 2, wherein the protective member is one of two protective members that are formed when the unnecessary portions of said protective sheet are removed, and the protective members are located on opposite lateral sides of the release sheet, and the target form is located between the protective members.

8. The method of claim 4, wherein the protective members are located on opposite lateral sides of the release sheet, and the target form is located between the protective members.

* * * * *